United States Patent
Rhodes et al.

(10) Patent No.: US 8,819,038 B1
(45) Date of Patent: Aug. 26, 2014

(54) SYSTEM AND METHOD FOR PERFORMING SET OPERATIONS WITH DEFINED SKETCH ACCURACY DISTRIBUTION

(71) Applicant: Yahoo! Inc., Sunnyvale, CA (US)

(72) Inventors: Lee Rhodes, Los Altos, CA (US); Anirban Dasgupta, Berkeley, CA (US); Kevin J. Lang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/078,301

(22) Filed: Nov. 12, 2013

Related U.S. Application Data

(60) Provisional application No. 61/887,375, filed on Oct. 6, 2013, provisional application No. 61/887,594, filed on Oct. 7, 2013.

(51) Int. Cl.
   *G06F 17/30* (2006.01)

(52) U.S. Cl.
   CPC .............. *G06F 17/30292* (2013.01)
   USPC ....................................................... 707/756

(58) Field of Classification Search
   CPC ................................................ G06F 17/30097
   USPC ....................................................... 707/756
   See application file for complete search history.

(56) References Cited

U.S. PATENT DOCUMENTS

| | | | |
|---|---|---|---|
| 6,629,097 B1* | 9/2003 | Keith | 1/1 |
| 8,266,126 B2* | 9/2012 | Labuda et al. | 707/703 |
| 2004/0030667 A1* | 2/2004 | Xu et al. | 707/1 |
| 2009/0303901 A1* | 12/2009 | Duffield et al. | 370/253 |
| 2011/0196964 A1* | 8/2011 | Natarajan et al. | 709/224 |
| 2012/0191714 A1* | 7/2012 | Datar et al. | 707/737 |

OTHER PUBLICATIONS

Edo Liberty, Simple and Deterministic matrix Sketching, Yahoo! Labs, 8 pages.*
Flajolet et al., "HyperLogLog: The Analysis of a Near-Optimal Cardinality Estimation Algorithm", dated 2007, 20 pages.
Girorie, Frederic, "Order Statistics and Estimating Cardinalities of Massive Data Sets", DMTCS, dated Apr. 26, 2005, 13 pages.
Gibbions et al., "Estimating Simple Functions on the Union of Data Streams", dated Nov. 10, 2000, 13 pages.
Yossef et al., "Counting Distinct Elements in a Data Stream", dated 2002, 10 pages.

(Continued)

*Primary Examiner* — Noosha Arjomandi
(74) *Attorney, Agent, or Firm* — Hickman Palermo Truong Becker Bingham Wong LLP

(57) ABSTRACT

Techniques are provided for improving the speed and accuracy of analytics on big data using theta sketches, by converting fixed-size sketches to theta sketches, and by performing set operations on sketches. In a technique for performing a set operation, two sketches are analyzed to identify the maximum value of each sketch. The maximum values of the two sketches are compared. Based the comparison, one or more values are removed from the sketch whose maximum value is greater. After the removal, a set operation (e.g., union, intersection, or difference) is performed based on the modified sketch and the unmodified sketch. A result of the set operation is a third sketch, which may be used to estimate a cardinality of the larger data sets that are represented by the two input sketches.

20 Claims, 18 Drawing Sheets

(56) References Cited

OTHER PUBLICATIONS

Beyer et al., "Distinct-Vale Synopses for Multiset Operations", Communications of the ACM, vol. 52, No. 10, dated Oct. 2009, 9 pages.
Chen et al., "A Simple and Efficient Estimation Method for Stream Expression Cardinalities", dated Sep. 23-28, 2007, 12 pages.
Cohen et al., Leveraging Discarded Samples for Tighter Estimation of Multiple-Set Aggregates, dated Jun. 15-19, 2009, 12 pages.
Ganguly et al., "Processing Set Expressions Over Continuous Update Streams", AMC, dated Jun. 9-12 2003, 12 pages.
Cormode, Graham, "Sketch Techniques for Approximate Query Processing", dated 2011, 67 pages.

* cited by examiner

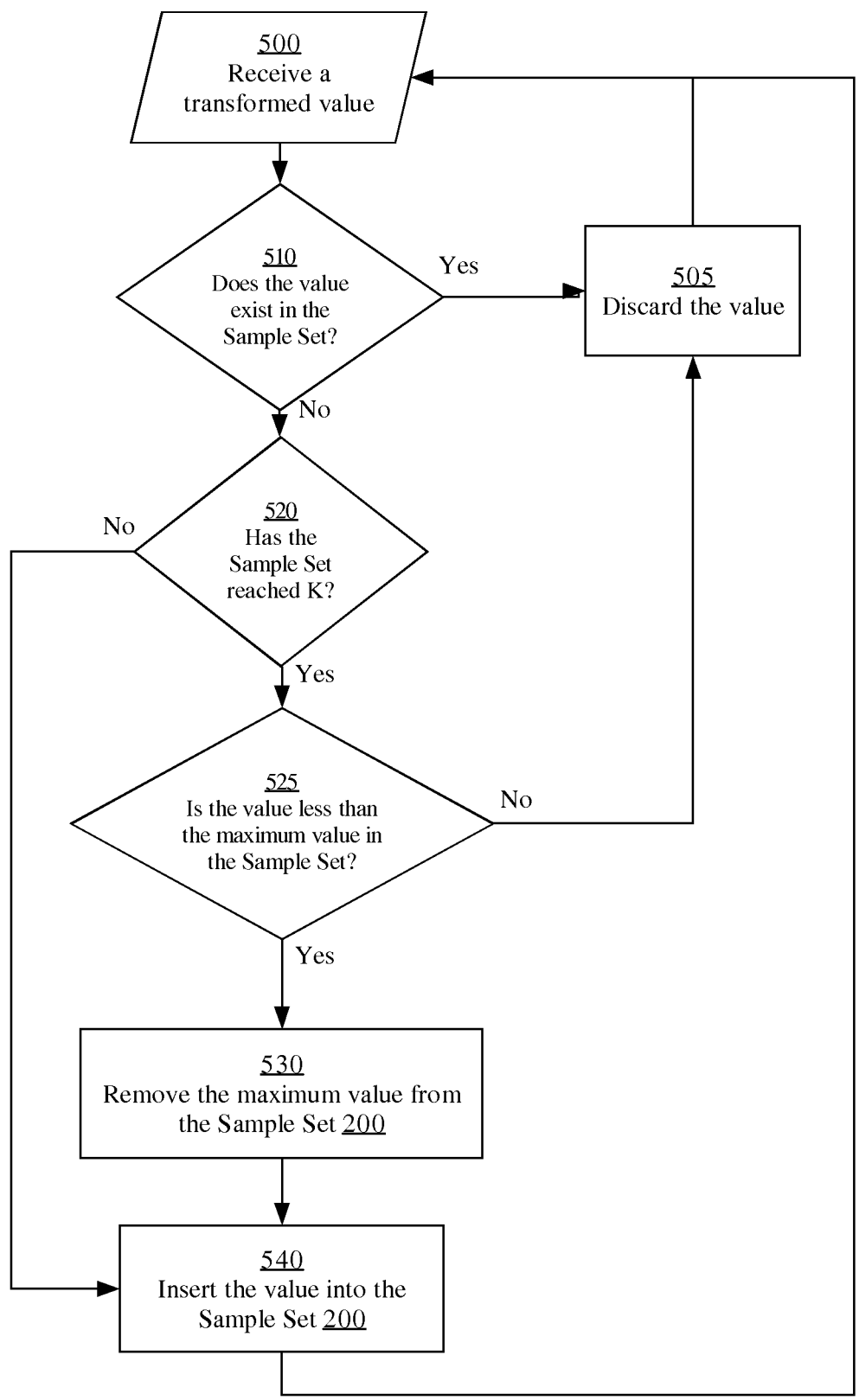
FIG. 5 - Fixed-Size Sketch Generation

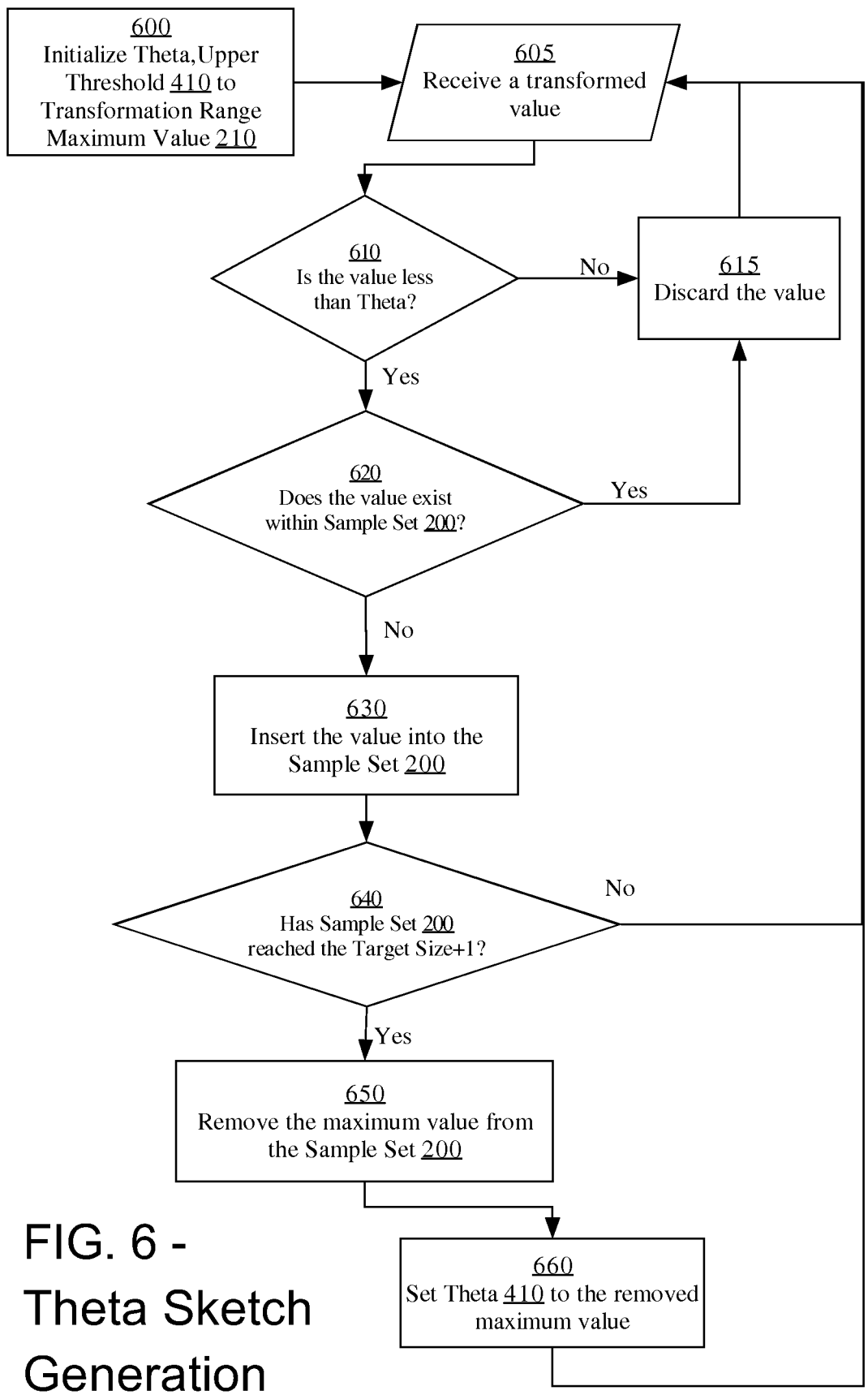
FIG. 6 - Theta Sketch Generation

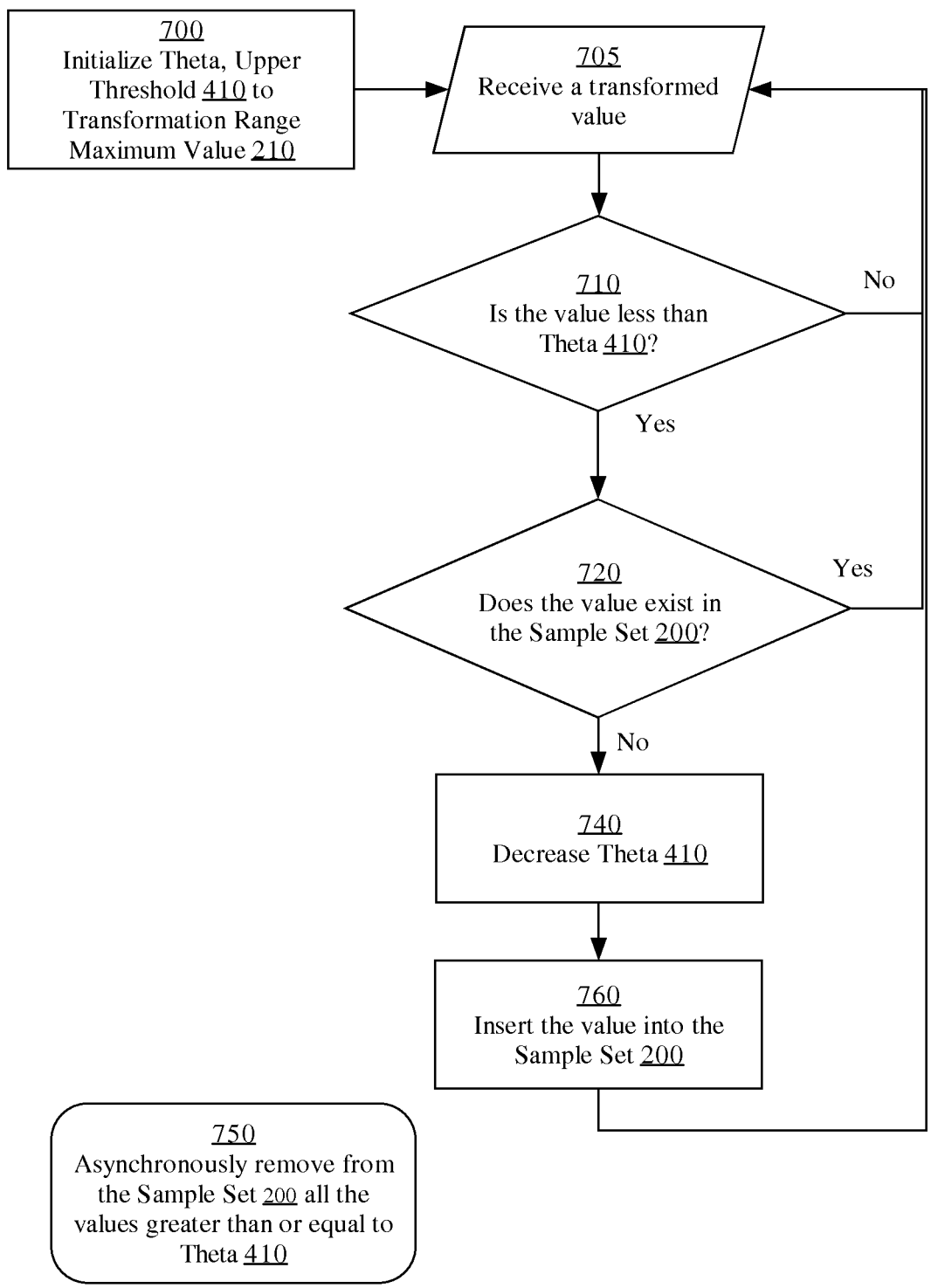
FIG. 7 - Theta Sketch Generation

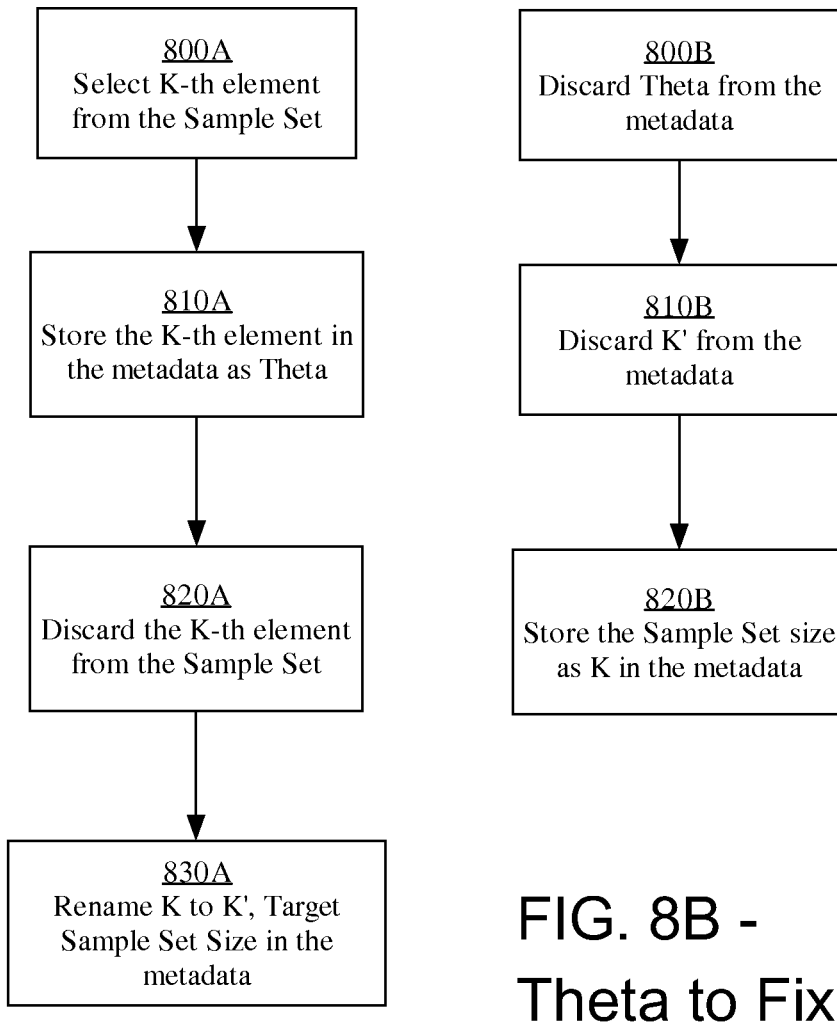
FIG. 8A - Fixed-Size to Theta Conversion
FIG. 8B - Theta to Fixed-Size Conversion FIG. 11 - Union Operation for Fixed-sized Sketches FIG. 12 - Union Operation on Fixed-sized Sketches FIG. 14 - Set Operation on Theta Sketches FIG. 15 - Intersection Operation on Theta Sketches FIG. 16 - Union Operation on Theta Sketches

SYSTEM AND METHOD FOR PERFORMING SET OPERATIONS WITH DEFINED SKETCH ACCURACY DISTRIBUTION

CROSS-REFERENCE TO RELATED APPLICATIONS; BENEFIT CLAIM

This application claims the benefit of Provisional Appln. 61/887,375, filed Oct. 6, 2013, and Provisional Appln. 61/887,594, filed Oct. 7, 2013, the entire contents of which are hereby incorporated by reference as if fully set forth herein under 35 U.S.C. §119(e).

FIELD OF THE DISCLOSURE

The present disclosure generally relates to statistical analysis of large data sets and, more specifically, to generating, storing, and performing set operations on statistical representations of large data sets.

BACKGROUND

Methods and systems designed for analyzing smaller data sets begin to break or become non-functional as the size increases. The analysis of larger amounts of data (colloquially called "big data") using conventional methods can require extensive computing resources, including processors and memory. Conventional methods may require data to be loaded into locally accessible memory, such as system memory or memory cache, where it can be processed to obtain results. However, as the amount of data increases, this can become impossible. In such situations, there is a need for generating results for complete analysis of the big data that do not require as much computational cost and latency. To achieve such an outcome, the accuracy of the results may be traded for less computational resources, such as memory.

Big data analysis also frequently involves processing of data along multiple dimensions. Such dimensions could be time or data type. For example, big data may contain a log of user IDs and timestamps for users who have requested a particular web application. The big data may also contain user IDs of blacklisted users for each month. The data analysis may require a monthly count report of all unique non-blacklisted users that have visited the web application. To achieve such a result, not only does the large log of user IDs need to be extracted from the big data and processed but also set operations of difference need to be performed on the log data with the blacklisted user data. Such requirements for set operations further complicate the data analysis for big data performed with limited computational resources.

Big data analysis presents a significant problem, in particular, for large website operators, such as Yahoo! Inc. A large website operator may generate terabytes of data per day describing the traffic to its website, or the content and advertisements displayed. While this vast pipeline of data can be mined for insights into the characteristics and behavior of its users, those insights are simply not available unless the pipeline of data can be analyzed, thereby permitting questions to be asked and answered within a relatively short period of time. For example, if the answer to a question about how many users visited a given website today takes until tomorrow to answer, then the answer may be of little use. Providing faster and more accurate answers to questions such as the unique number of visitors to a given website, or the number of clicks on a given item of content or advertisement, are technical problems of the utmost importance to website operators.

More specifically, many big data analysis scenarios, such as user segment analysis, require set operations (e.g., intersection, union and difference) on sets of unique identifiers. When the data is larger than can be normally handled in memory, the unique counting as well as the set operations can be very expensive to compute exactly. If approximate answers are acceptable, then sketching technology can significantly reduce both the computational cost and the latency of obtaining results.

A sketch can be more than just a mechanism to approximate unique counts. It can be thought of as a data structure that approximates a larger set of values. A sketch, in fact, may be a substantially uniform and random reservoir sample of all the unique values presented to it. It is then reasonable to ask: given two sketches can one determine, approximately, the number of unique values that form the intersection of the two large data sets represented by the sketches? Or, perhaps, could sketches represent other set operations such as difference—the number of unique values that are present in only one of two large data sets?

For systems that generate millions of sketches or where query latency is critical, to be able to perform set operations on the same sketches that do the unique counting is a huge benefit and eliminates the need for separate processes. Example applications where set operations are intrinsic include segment overlap analysis (intersection), segment rollup analysis (union), retention analysis (intersection), and blacklist removal (set difference). Examples of segments for a website operator might be users (defined by login), impressions on items of content, clicks on advertisements, or other large-scale sets of data relating to website traffic.

Getting faster and more accurate answers to questions about website traffic is an important technical problem facing many website operators.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

By introduction of a defined threshold theta to the computation of sketches, as disclosed below, a system and method is provided that achieve improvements in the speed and efficiency with which set operations may be performed (and questions thereby answered) on big data. More specifically, advantages over prior art techniques are achieved for computing and performing set operations with sketches, including one or more of the following:

The same sketch used for unique counting can also be used for set operations with very good accuracy. This enables significant reduction in process complexity that would otherwise require separate processes for these computations.

The result of a set operation is another sketch, not just a number. This enables asynchronous or out-of-order computations that are very frequent in batch pipeline operations.

The size-controlling role of K (which refers to a pre-defined maximum sketch sample set size) can be disabled when performing union operations. Such disabling allows the union of two sets to be larger than either of two initial sketches with improved accuracy. This feature may be critical for data query operations where the query engine constructs a set expression with multiple terms. Disabling K also enables set expression evaluation order independence.

Sketches with different values of K (which implies different configured accuracy or size) can now be targets of any of the set operations.

These and other advantages are provided by the method and system further disclosed below. These systems and methods are operable to provide, among other things, faster and more accurate unique counts of visitors to a given website, faster and more accurate answers to questions about particular demographic segments that are represented in visits, impressions, click-through rates, or other data signals collected by website operators.

BRIEF DESCRIPTION OF THE DRAWINGS

In the drawings of certain embodiments in which like reference numerals refer to corresponding parts throughout the figures:

FIG. 5 is a flow diagram that depicts a process for generating a fixed-size sketch with K maximum size sample set, in an embodiment.

FIG. 6 is a flow diagram that depicts a process for generating a theta sketch, in an embodiment.

FIG. 7 is a flow diagram that depicts a process for generating a theta sketch with an asynchronous cleanup of data, in an embodiment.

FIG. 8A is a flow diagram that depicts a process for converting a fixed-size sketch into a theta sketch, in an embodiment.

FIG. 8B is a flow diagram that depicts a process for converting a theta sketch into a fixed-size sketch, in an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Analyzing big data can be an extremely computationally intensive task with results obtained with significant latency. Sketching techniques can significantly reduce both the computational cost and the latency in obtaining results for the big data. Sketching techniques involve transforming big data into a mini data set, or sample set, that is representative of big data's particular aspects (or attributes) and are used, in various embodiments, to obtain a particular data analysis result estimation, such as unique entry counts, within big data. These mini sample sets, and in some embodiments associated metadata, are generally known as "sketches" or sketch data structures.

Sketches are useful, for example, for counting unique values (i.e. for estimating cardinality) for big data. This is because sketches can be order insensitive, duplicate insensitive, and have well-defined and configurable bounds of size and error distribution. The order insensitive property means that the input data stream from big data can be processed as is; no ordering of the incoming data is required. The duplicate insensitive property means that all duplicates in the input stream will be ignored, which is important in estimating cardinality. The importance of having a bounded size is that one can plan for a maximum memory or disk storage capacity independent of how large the input data stream from the big data becomes. With a bounded, well defined and queryable error distribution, it is possible to report to the user not only any estimated result but the upper and lower bounds of that estimate, based on a confidence interval, as well.

Overview of Generating and Using a Sketch

Figure 1:
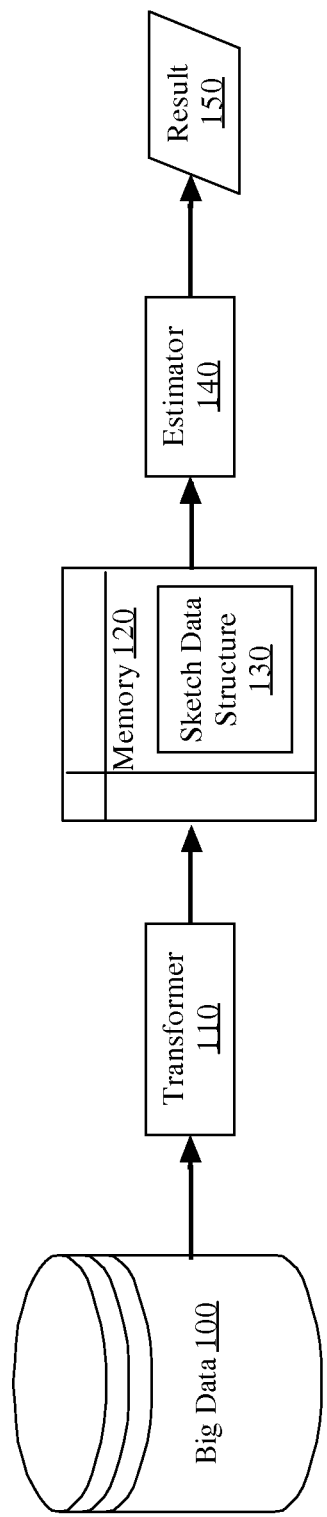
FIG. 1 is a system diagram that depicts program logic for generating a result for big data using a sketch data structure, in an embodiment.

FIG. 1 is a system diagram that depicts program logic for generating a sketch and estimating cardinality of a large data set that the sketch represents, in an embodiment. A data stream is generated from Big Data 100 and fed into transformer 110. Transformer 110 transforms the data stream into a representative set of values in such a way where only a portion of the transformed set needs to be analyzed to yield a desired estimation of a result. For example, to estimate cardinality within the data stream, transformer 110 may be a hash function that produces the same hash for the same data value from the data stream. In some instances, a hash function may generate the same hash value based on two or more unique input data values. But taking into consideration the kind of data in the data stream, the choice of hash algorithm may be made to reduce or avoid such collisions.

Transformer 110 also produces close to a uniform, random distribution of transformed values. Due to this property, only a particular subset of the transformed values needs to be examined to yield an estimation for cardinality for the whole set. Thus, only this subset of transformed values needs to be stored in memory 120, as part of sketch data structure (or simply "sketch") 130. Similarly for other transformations, only a subset of transformed data values is collected in sketch 130 in memory 120. The selected subset of transformed values and, thus, the size of sketch 130 may be limited by the available memory 120. Estimator 140 processes sketch 130 and its subset of values to estimate result 150. For example, in some embodiments, when cardinality is requested as result 150, estimator 140 would use the size of sketch 130 (i.e., the number of elements) and/or values within sketch 130 to estimate the cardinality of the large data set that sketch 130 represents and output the estimated cardinality as a result for Result 150.

Each of transformer 110 and estimator 140 are part of computer system and may be implemented in software, hardware, or a combination of software and hardware. For example, one or more of transformer 110 and estimator 140 may be implemented using stored program logic, in a non-transitory medium such as the memory of a general-purpose computer or in hardware logic.

Generally, a sketch is generated to estimate a single result. Such a sketch may represent only a particular attribute of big data relevant to the result. For example, a sketch may be generated to estimate a number of unique user IDs for users who have used a web application for a particular month. However, estimations for other months may also be requested for latter comparisons and, thus, a separate sketch would need to be generated for each month requested. These generated sketches then can be stored in a persistent storage, as "SketchMart," along with the dimension for which the sketches were generated. A "SketchMart" is a set of sketches, where each sketch is related to at least one other sketch in the set and where combining two related sketches in the SketchMart yields a meaningful result. In this example, the dimension is a time dimension of months. Once stored in in a SketchMart, the sketches may be queried based on the time dimension and used for an estimation of a result, but even more importantly, for set operations to yield new sketches.

In much of data analysis for big data, multiple large data sets from big data need to be processed to yield a particular result. For example, the big data may contain a log of user IDs and timestamps for users who have visited a particular web application. The big data may also contain user IDs of blacklisted users for each month. The data analysis may require a monthly count report of all unique non-blacklisted users that have visited the web application.

An estimate of such results could be achieved by proper set operations on sketches. Set operations may be performed on sketches to produce another sketch. The produced sketch can then be used for an estimation of a result that would be an estimation of the result that would have been produced by an actual intersection of large data sets from big data. Thus, sketches that are stored in a SketchMart may be queried for performing various set operations to obtain a desired result estimation.

Sketch Data Structure

A sketch data structure (or "sketch") includes a sample set of transformed values and metadata associated with the sketch. In an embodiment, a sketch does not contain metadata, such as metadata that indicates the size of (or the number of transformed values in) the sample set. Instead, such metadata may be derived from the sample set itself. A sketch contains values resulting from transformation of big data. The sketch contains only a subset of all transformed values generated from big data, where the size of the sketch may be based on available computational resources, such as memory.

Figure 2:
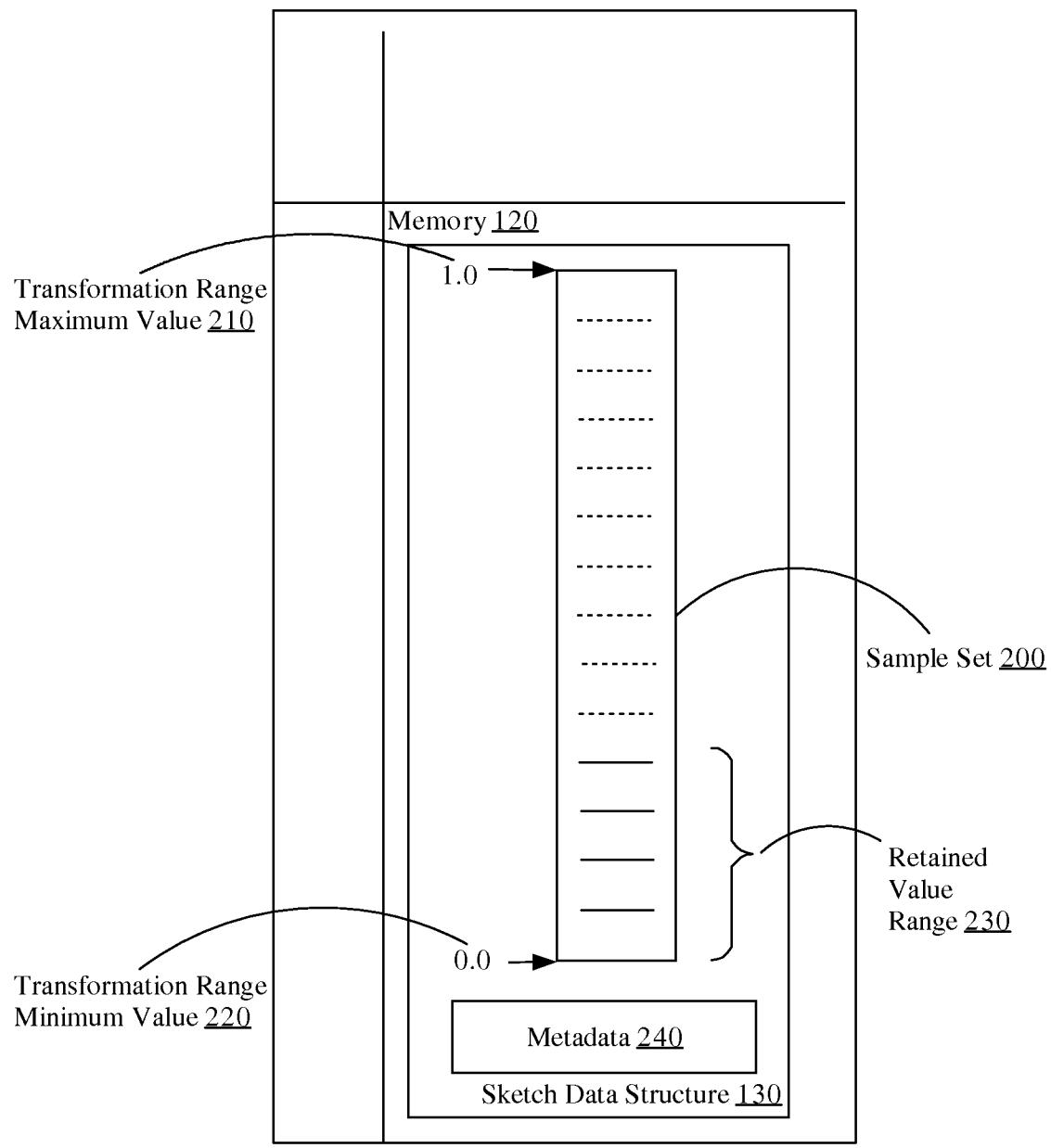
FIG. 2 is a block diagram that depicts a sketch sample set within memory.

FIG. 2 illustrates an embodiment of sketch 130 residing within memory 120. In an embodiment, data values from big data are transformed using a hash function. The distribution of hash function values are illustratively denoted as being all real values from Transformation Range Minimum Value 220 of 0.0 to Transformation Range Maximum Value 210 1.0. As the transformed values are received, only the values within Retained Value Range 230 are retained within sample set 200. Metadata 240 includes metadata for sketch 130, such as the maximum size of sample set 200 and Retained Value Range 230 thresholds. In another embodiment, the retained value range may be adjacent to the Transformation Range Maximum Value 210. In still another embodiment, the retained value range may be between the Transformation Range Minimum Value 220 and the Transformation Range Maximum Value 210.

Fixed-Size Sketch Data Structure

Figure 3:
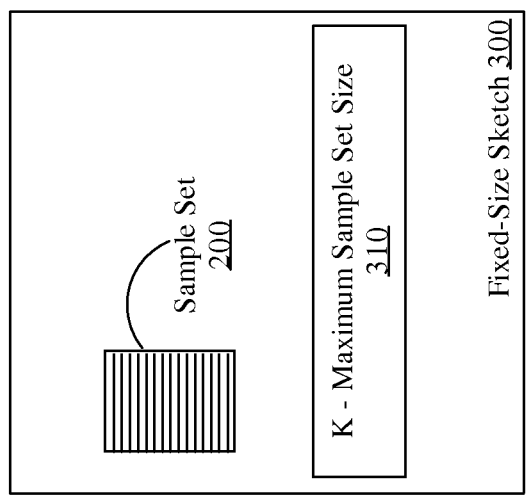
FIG. 3 is a block diagram that depicts a fixed-size sketch with K maximum sample set size, in an embodiment.

A fixed-size sketch data structure, also referred to as "fixed-size sketch," is a type of sketch data structure where the sample set retains values based on a predefined size. If the sample set has reached its predefined size (e.g., maximum allowed entries) and a new transformed value is received, then the new value would either replace an existing value in the sketch sample set, or will be discarded and not stored within the sample set. The predefined size for the sample set may be stored as part of Metadata 240 or for already generated fixed-size sketches, may be computed from the sample set itself. The predefined size is denoted as K, maximum sample set size. FIG. 3 illustrates an embodiment of Fixed-Size Sketch 300 that has Sample Set 200 and K, Maximum Sample Set Size 310.

FIG. 5 illustrates an embodiment to generate a fixed-size sketch for cardinality computation. As an example of a fixed-size sketch, the following description refers to Fixed-Size Sketch 300 of FIG. 3. In block 500, a transformed value is received. If it is determined at block 510 that the transformed value is already within Sample Set 200 of FIG. 3, then the value is discarded at block 505 and the process proceeds to block 500. If the received transformed value is not within Sample Set 200, then Sample Set 200 is evaluated for available space at block 520.

If it is determined at block 520 that Sample Set 200 has already reached K, Maximum Sample Set Size 310 of FIG. 3, then, at block 525, the transformed value is compared with the maximum value in Sample Set 200. If the transformed value is less than the maximum value, then, at block 530, the maximum value is discarded from Sample Set 200 to make space for the transformed value. However, if the transformed value is greater than the maximum value in Sample Set 200, then the value is discarded at block 505 and the process proceeds to block 500.

At block 540, the received transformed value is inserted into Sample Set 200. In an embodiment, Sample Set 200 is an ordered list of values, where the smallest value in Sample Set 200 is the first element and the greatest value is the K-th element in Sample Set 200. Thus, according to such embodiment, the K-th value in Sample Set 200 would be evaluated at block 525 and would be removed at block 530.

Threshold (Theta) Sketch Data Structure

A threshold sketch data structure (or "theta sketch") is a type of sketch where the sample set retains values based on one or more threshold values and a target sample set size. Determination of whether to insert a received transformed value into the sample set is based on whether the received value is greater or less than one or more threshold values for the sketch. The threshold values may be adjusted to accommodate a bound size for the sample set. The bound size for the sample set may be computed based on a target sample set size for the sketch that is stored as part of metadata for the sketch. Any values that are outside of the adjusted threshold values may be discarded from the sketch. In an embodiment, the discarding of sketch data values that are outside of the adjusted threshold values may be performed asynchronously from the receipt of a transformed value. In a related embodiment, the threshold value adjustment itself may be performed asynchronously from the receipt of a transformed value.

Figure 4:
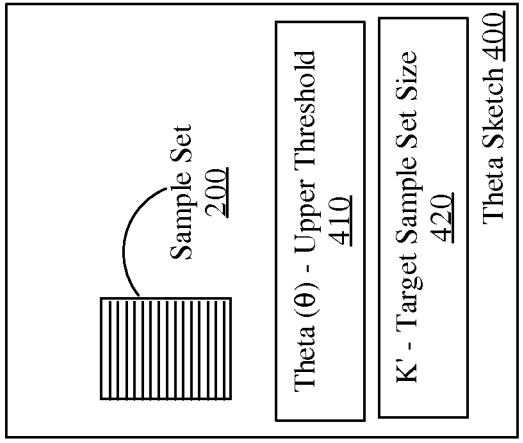
FIG. 4 is a block diagram that depicts a threshold sketch with Theta, an upper threshold, and a target sample set size, in an embodiment.

FIG. 4 is a block diagram that depicts a theta sketch 400, in an embodiment. Theta sketch 400 contains sample set 200 with K', Target Sample Set Size 420 and Theta, Upper Threshold 410 as metadata for the sketch. Theta sketch 400 is generated by receipt of transformed values from big data. Theta sketch 400 has a minimum threshold value equal to the transformation range minimum value, and thus the minimum threshold value need not stored as part of the metadata for Theta Sketch 400.

FIG. 6 is a flow diagram that depicts a process for generating a theta sketch, in an embodiment. FIG. 6 is described using theta sketch 400 and sample set 200 of FIG. 4. At block 600, Theta, Upper Threshold 410 is initialized to Transformation Range Maximum Value 210 of FIG. 2. At block 605, a transformed value is received. At block 610, if the value is greater than or equal to Theta 410, the transformed value is discarded at block 615 and the process returns to block 605 to process the next transformed value.

At block 620, it is determined whether the transformed value is unique relative to the other transformed values in the sample set. If not, then the transformed value is discarded at block 615 and the process returns to block 605. However, if it is determined that the transformed value is unique, then, at block 630, the received transformed value is inserted into Sample Set 200.

At block 640, the current size of Sample Set 200 is compared with K', Target Sample Set Size 420. If the size of Sample Set 200 has already reached K' plus one value, then at block 650, the maximum value is removed from Sample Set 200, and, at block 660, Theta is assigned to the removed maximum value. Otherwise, if the size of Sample Set 200 has not reached K' plus one value, then Theta 410 stays unchanged, and the process returns to block 605.

In an embodiment, Sample Set 200 is an ordered list of values, where the smallest value in Sample Set 200 is the first element and the greatest value is the last element in Sample Set 200. Thus, in such an embodiment, the last value is discarded from Sample Set 200 at block 650, and Theta 410 is assigned to the last value in Sample Set 200 at block 660.

While the above example indicates that the range of sample set 200 is from 0 to a value (theta) that represents a value less than 1, embodiments are applicable to the scenario where the range of a sketch's sample set is from a value that represents '1' to a value that represents a value greater than '0'. In such an embodiment, a received threshold value would be compared to a lower threshold (not depicted) instead of upper threshold 410. Cardinality estimations and set operation for such embodiments would change accordingly.

FIG. 7 illustrates another embodiment to generate Theta Sketch 400 with Sample Set 200 of FIG. 4 for cardinality computation. Similar to block 600, at block 700, Theta, Upper Threshold 410 is initialized to Transformation Range Maximum Value 210 of FIG. 2. Similar to block 605, at block 705, a transformed value is received. Similar to block 610, block 710 involves determining whether the transformed value is less than Theta 410. If not, then the transformed value is discarded and the process proceeds to block 705 to receive the next transformed value, if any. If the transformed value is less than Theta 410, then the process proceeds to block 720, where it is determines whether the transformed value is unique relative to other transformed values in Sample Set 200 of FIG. 4.

If it is determined that the transformed value is not unique (i.e., the transformed value is already within Sample Set 200), then the transformed value is discarded. However, unlike block 630, if the transformed value is not within Sample Set 200, then the size of Sample Set 200 is not compared with K', Target Sample Set Size 420. Rather, Theta 410 is decreased at block 740, and the transformed value is inserted into Sample Set 200 at block 760. At block 750, which may be performed asynchronous from the receipt of transformed values, values in Sample Set 200 that are greater than or equal to Theta 410 are discarded from Sample Set 200.

According to an embodiment, at block 740, Theta 410 is decreased based on K', Target Sample Set Size 420. Theta 410 may be decreased based on K' in multiple ways. Embodiments are not limited to any particular technique. For example, Theta (θ) 410 may be decreased according to the following equation, where K is the actual sample set size:

$$\theta_{new} = \theta \frac{K'}{K}. \tag{1}$$

As another example, Theta (θ) 410 may be decreased according to the following equation:

$$\theta_{new} = \theta \frac{K'-1}{K'} \tag{2}$$

As another example, Theta 410 may be decreased according to the following equation:

$$\theta_{new} = \theta \frac{K'-0.5}{K'+0.5}. \tag{3}$$

As yet another example, Theta 410 may be decreased according to the following equation:

$$\theta_{new} = \theta \frac{K'}{K'+1}. \tag{4}$$

Sketch Conversion

In an embodiment, a fixed-size sketch is converted to a theta sketch and/or vice versa. Converting a fixed-size sketch to a theta sketch involves removing minimum and/or maximum values from the fixed-size sketch and storing the values in the sketch metadata as thresholds. Also, if K (i.e., the maximum sample set size) is stored in the metadata of a fixed-size sketch, then K may be removed from the metadata. The resulting sketch would constitute a theta sketch rather than a fixed-size sketch.

Similarly, converting a theta sketch to a fixed-size sketch involves discarding the one or more threshold values from theta sketch metadata, while the size of the current sample set may be stored in the metadata. The resulting sketch would constitute a fixed-size sketch.

FIG. 8A illustrates a conversion of a fixed-size sketch into a theta sketch, using the example of the fixed-size sketch in FIG. 3, in an embodiment. At block 800A, the K-th element is selected from the Sample Set 200 of Fixed-Size Sketch 300. At block 810A, the K-th element stored in the metadata as the theta upper threshold. At block 820A, the K-th element is discarded from the Sample Set 200. At block 830A, in the metadata, K, Maximum Sample Set Size 310, is renamed to K', Target Sample Set Size at block 830A. The resulting sketch is then considered a theta sketch.

FIG. 8B illustrates a conversion of a theta sketch into a fixed-size sketch, using the example in FIG. 4, in an embodiment. At block 800B, Theta, Upper Threshold 410 is discarded from the metadata. At block 810B, K', Target Sample Set Size 420 is also discarded from the metadata. At block 820B, the size of the sample set is stored in metadata as K, maximum sample set size. The resulting sketch is then considered a fixed-size sketch. Although FIGS. 8A and 8B are depicted and described in a particular order, embodiments are not limited to that particular order. For example, block 830A may be performed before block 800A and block 810B may be performed before 800B.

In an embodiment, sketch conversion is performed on multiple sketches. For example, a set of multiple fixed-size sketches are converted to a set of theta sketches as part of a single operation. Such a single operation may be performed in response to receiving a single command from a user. The single command may specify individual sketches or may specify a physical or logical container that stores the set of sketches that are to be converted. Thus, individual input is not required after one sketch is converted and before another sketch is converted. Instead, multiple sketches may be converted from one type (e.g., fixed) to another type (e.g., theta) in parallel.

Cardinality Estimation

Cardinality for a large data set from big data can be estimated based on a sketch for the large data set. In an embodiment, large data set values are transformed using a hash function. Such transformation uniformly randomizes the large data set values without losing one-to-one correspondence between the large data set values and transformed values. The transformed values are uniformly distributed within a transformation range maximum value and a transformation range minimum value, and a sample set is generated by capturing only a contiguous subset of the transformed values. Thus, the cardinality of the captured sample set is proportional to the cardinality of the transformed value data set and to the cardinality of the large data set. The proportionality can be represented by the following equation, where est ($|M_i|$) is estimated cardinality of the large data set, $|S_i|$ is the cardinality of $S_i$, a sketch of $M_i$, $F(M_i)_{max}$ is a transformation range maximum value and $F(M_i)_{min}$ is a transformation range minimum value, $x_{max}$ is the sample set maximum value in the retained value range and $x_{min}$ is the sample set minimum value in the retained value range:

$$\frac{est(|M_i|)}{|S_i| - 2} = \frac{F(M_i)_{max} - F(M_i)_{min}}{x_{max} - x_{min}}. \quad (5)$$

In an embodiment, the above equation (5) can be further simplified for theta sketches. For a theta sketch, $|S_i|-2$ is the cardinality of the theta sketch, $x_{max}$ is the upper threshold, $\theta_{hi}$, and $x_{min}$ is the lower threshold, $\theta_{lo}$. Thus, for theta sketch, the equation (5) can be further simplified to the following:

$$est(|M_i|) = \frac{|S_i| * (F(M_i)_{max} - F(M_i)_{min})}{\theta_{hi} - \theta_{lo}}. \quad (6)$$

According to an embodiment, the transformation value range can be normalized from 0 to 1, where the sketch retained value range has minimum value of 0. Thus, the equation (5) can be further simplified for this embodiment:

$$est(|M_i|) = \frac{|S_i| - 1}{x_{max}}. \quad (7)$$

Based on the above equation (7), the cardinality estimation for both fixed-size sketches and theta sketches can be easily derived. For a fixed-size sketch, $|S_i|$ is the cardinality of the fixed-size sketch, and $x_{max}$ is the K-th value of the fixed-size sketch. For a theta sketch, $|S_i|-1$ is the cardinality of the theta sketch, and $x_{max}$ is the upper threshold, $\theta$. Thus, for theta sketch, the cardinality equation can be further simplified to the following:

$$est(|M_i|) = \frac{|S_i|}{\theta}. \quad (8)$$

In another embodiment, a theta sketch, with K', Target Sample Set Size, is constructed from a large data set using the process in FIG. 7, where $\theta$, Upper Threshold, is decreased at block 740 using equation (4). In such embodiment, the following equation provides est ($|M_i|$), estimated cardinality of the large data set:

$$est(|M_i|) = \frac{K'}{\theta}. \quad (9)$$

Sketchmart

Sketches may be stored in a database for later use. The database may be any queryable persistent storage, such as a relational database or a distributed file system.

Sketches may be aggregated along a particular dimension into a set of sketches, referred herein as a "SketchMart." Each sketch in a SketchMart is related to at least one other sketch in the set. Also, combining two related sketches in the SketchMart yields a meaningful result, such as the number of unique users who have visited both a financial website and a sports website during a particular month.

Figure 9:
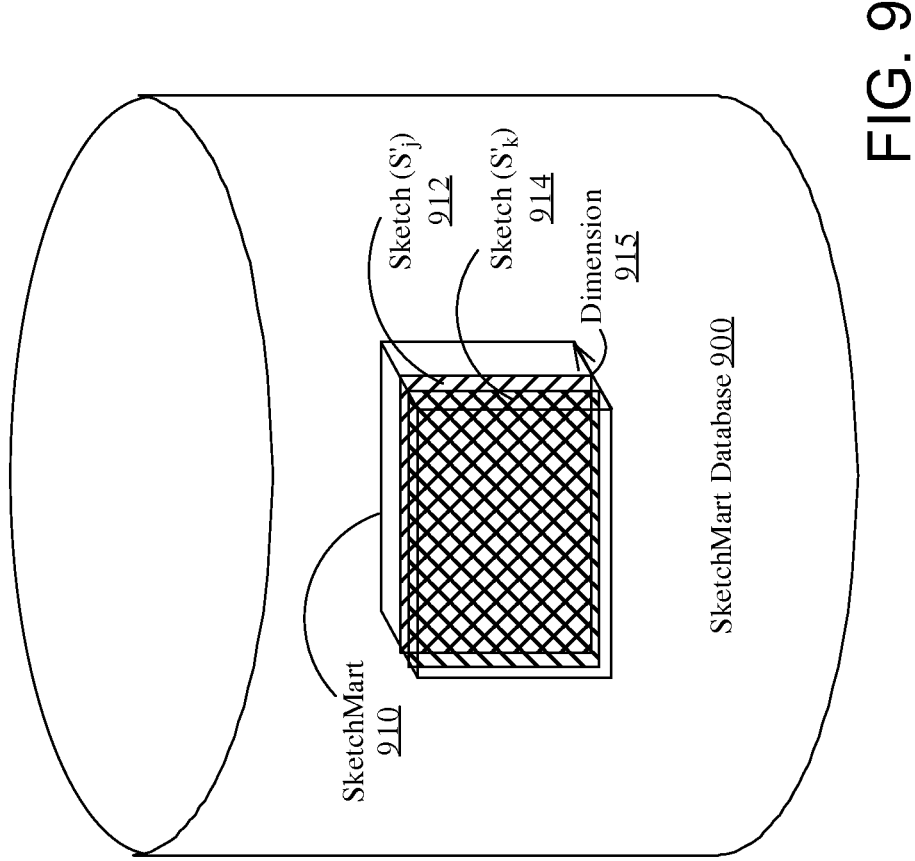
FIG. 9 is a block diagram that depicts a SketchMart database with a SketchMart comprising of aggregation of sketches along a dimension, in an embodiment.

FIG. 9 is a block diagram that depicts a SketchMart 910 that is stored in SketchMart Database 900, in an embodiment. Although only one SketchMart is depicted in FIG. 9, SketchMart Database 900 may include multiple SketchMarts. Sketch ($S'_j$) 912 and Sketch ($S'_k$) 914 are part of SketchMart 910 and have been collected and/or generated along dimension 915. The number and type of dimensions that may be used to group Sketches into SketchMarts are numerous. Example dimensions include time (e.g., day, month, or year), web portal, web application, geographical location of client device submitting requests, type of those client devices (e.g., tablet, desktop, smartphone), type of OS of the client devices (e.g., Windows, Android, iOS).

SketchMart Database 900 may be queried based on a SketchMart identifier and a dimension value to retrieve a particular sketch or set of sketches from the identified SketchMart. For example, a query to retrieve one or more sketches from SketchMart 910 may specify a range of dimension values (e.g., "month=January && February") and might retrieve Sketches 912 and 914 from SketchMart Database 900.

In an embodiment, a SketchMart is either a "fixed-size SketchMart" or a "Theta SketchMart." A fixed-size SketchMart is a SketchMart that comprises fixed-size sketches. Each sketch in a fixed-size SketchMart has the same number of transformed values as each other sketch in the fixed-size SketchMart.

Sketch Set Operations

Sketches may be combined to estimate a result for combination of larger data that the sketches represent. Since a sketch consists of a sample set and metadata, two or more sketches may be combined using a desired set operation on sample set and an adjustment to resulting sketch metadata, if any exists. Set operations include union, intersection, and difference. There are numerous scenarios in which it would be desirable to combine two or more sketches. One example scenario is determining a number of users that visited a certain webpage or website at least once each month of a particular year. Such a scenario is reflected in FIG. 10.

Figure 10:
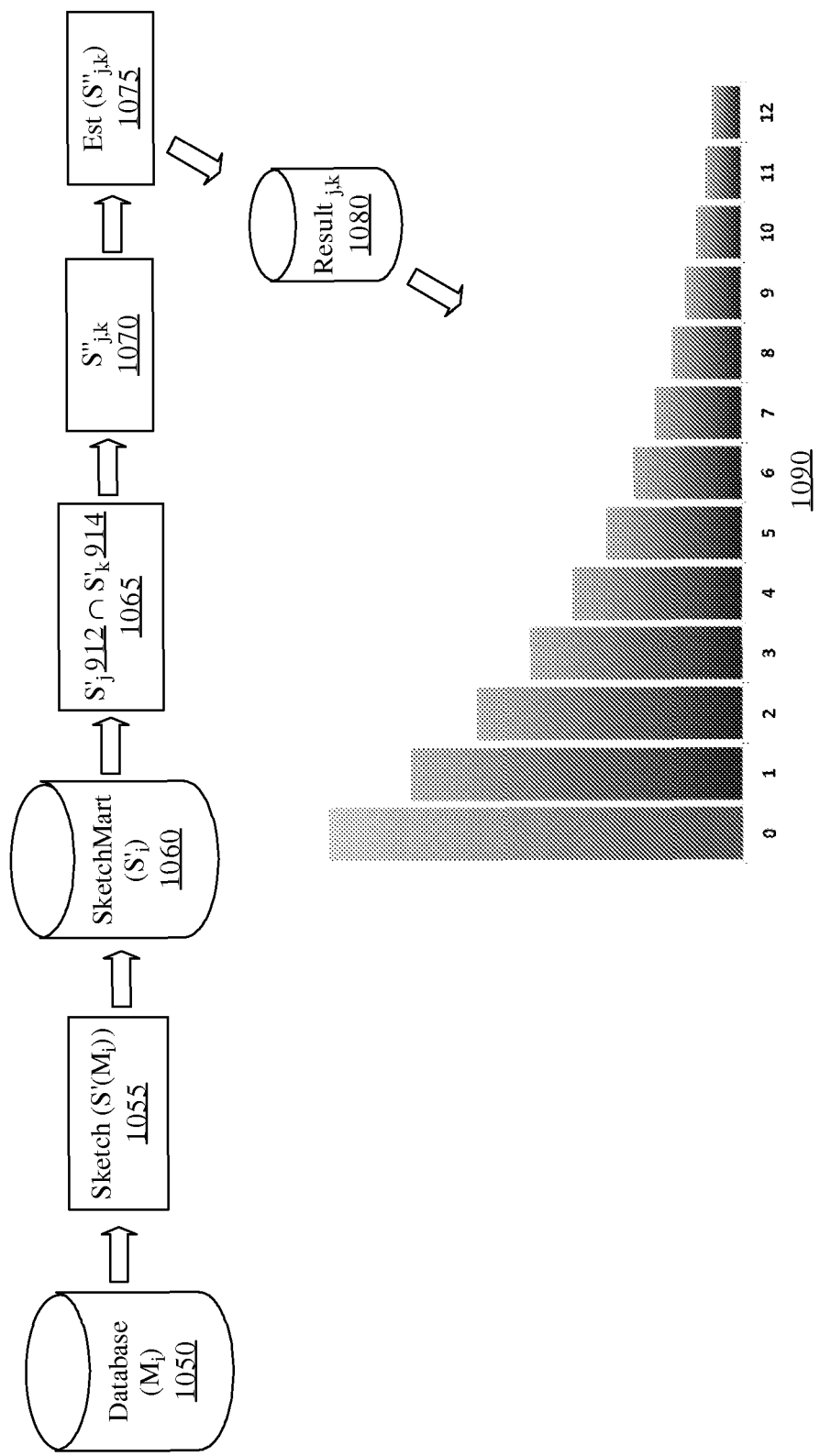
FIG. 10 is a block diagram that depicts the generation and usage of sketches in a SketchMart, in an embodiment.

FIG. 10 is a block diagram that depicts combining multiple sketches to generate another sketch, in an embodiment. Specifically, FIG. 10 depicts a database ($M_i$) 1050 of user IDs. The user IDs from database 1050, for each month i, are transformed into Sketch $S'(M_i)$ 1055, which represents user ID data for each month i. The generated sketches are stored in SketchMart ($S'_i$) 1060 along month dimension i. Therefore, Sketch ($S'_j$) 912 and Sketch ($S'_k$) 914 may represent sketches for the j month and k month, respectively. Thus, query to SketchMart Database 900 for a user ID sketch for the j month would return Sketch ($S'_j$) 912. See further description of FIG. 10 below.

Fixed-Size Sketch Set Operations

Set operations may be performed on fixed-size sketches to yield a resulting fixed-size sketch. The resulting fixed-sized sketch may depend on the number of values produced from the set operation. However, the resulting sample set size may be reduced to the minimum sample set size of the operated sketches to accommodate limited computational resources.

In an embodiment, a fixed-size union sketch is constructed by performing a union set operation on the sample sets of operated sketches. The resulting union sample set size is matched with the size of the smallest operated sketch size sample set by removing the greater value. In other words, if K is the sample set size of the smallest operated fixed-size sketch, then only the first K smallest values in the union sample set are preserved; the rest of the values are discarded. Thus, the fixed-size union sketch would contain the resulting union sample set and have maximum sample set size equal to the smallest K, maximum sample set size, of the operated fixed-size sketches.

For example, Sketch $S'_j$ may contain sample set with values 0.1, 0.3, 0.4, 0.5, 0.6 and 0.7 with K, maximum sample set size set to 6. Sketch $S'_k$ may contain sample set values 0.2, 0.4 and 0.6 with K, maximum sample set size set to 3. The union set operation performed on the two sample sets would yield a union sample set of values: 0.1, 0.2, 0.3, 0.4, 0.5, 0.6 and 0.7. Since the union sample set size is 7 that is greater than the smallest K, which is 3, the greater values are removed from the union sample set to reduce the size to the smallest K, 3. Thus, the resulting union Sketch $S''_u$ contains sample set values: 0.1, 0.2 and 0.3 and has K, maximum sample set size of 3.

In a related embodiment, a fixed-size union sketch is similarly constructed by performing a union set operation on the sample sets of operated sketches. Then, the resulting union sample set is reduced based on the K-th values, the greatest values in each of the operated sample sets. The K-th values of the operated sample sets are compared, and all the values in the union sample set that are greater than the smallest of K-th values are removed from the union sample set. Subsequently, the fixed-size union sketch would contain the resulting union sample set and have maximum sample set size equal to the resulting sample set size.

For example, Sketch $S'_j$ may contain sample set with values 0.1, 0.3, 0.4, 0.5, 0.6 and 0.7 with K, maximum sample set size set to 6. Sketch $S'_k$ may contain sample set with values 0.2, 0.4 and 0.6 with K, maximum sample set size set to 3. The union set operation performed on the two sample sets would yield a union sample set of values: 0.1, 0.2, 0.3, 0.4, 0.5, 0.6 and 0.7. $S'_j$ has the greatest value, K-th value, of 0.7, and $S'_k$ has the greatest value, K-th value, of 0.6. Thus, the smallest K-th value would be 0.6, and all the values in the union sample set that are larger than 0.6 would be removed. Thus, the resulting union Sketch $S''_u$ would contain sample set values: 0.1, 0.2, 0.3, 0.4, 0.5 and 0.6 and have K, maximum sample set size of 6.

Figure 11:
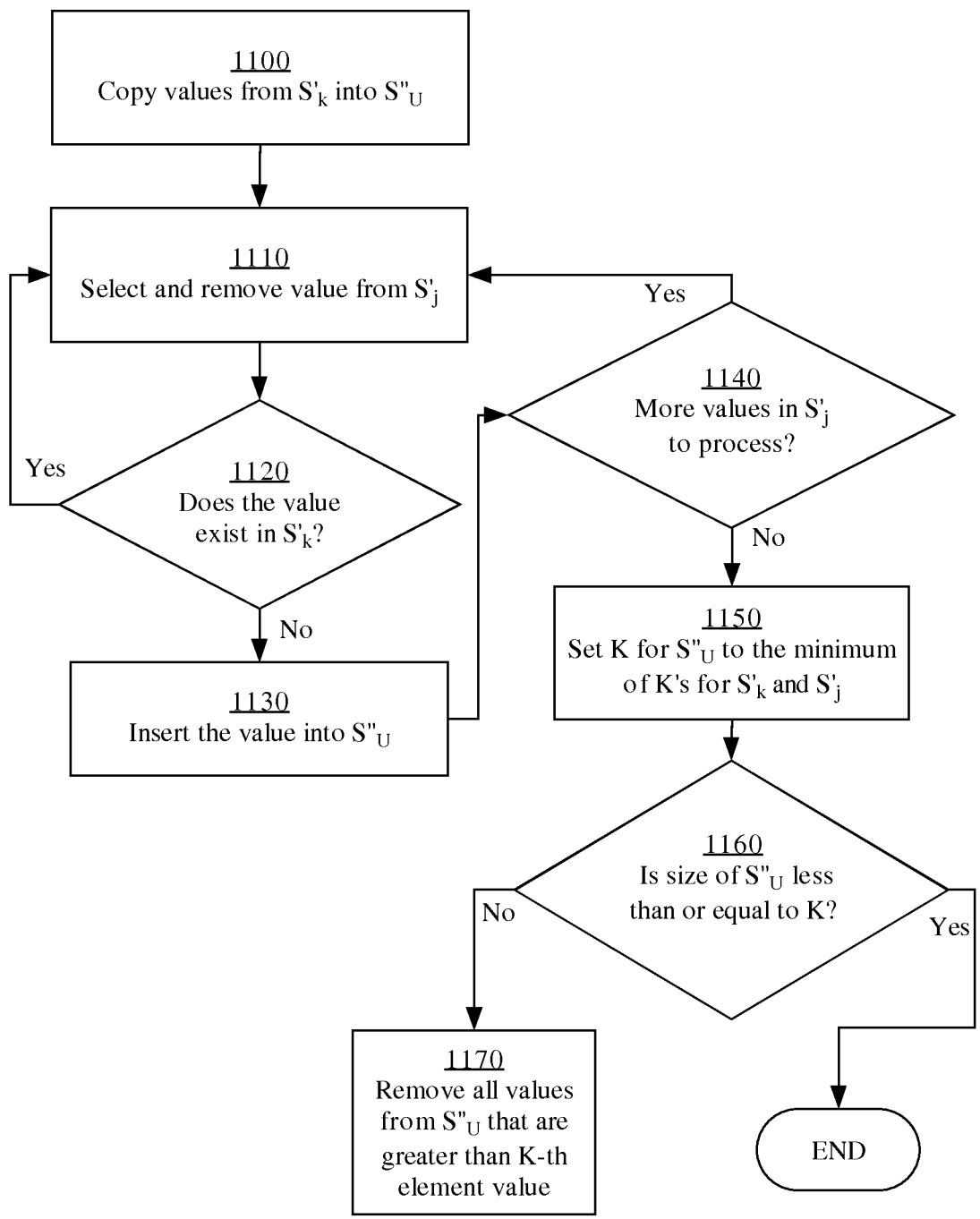
FIG. 11 is a flow diagram that depicts a process for performing a union operation on two fixed-size sketches to yield a union fixed-size sketch, in an embodiment.

FIG. 11 is a flow diagram that depicts a process for performing a union set operation on fixed-size sketches, in an embodiment. The fixed-sized sketches are referred to as Sketch $S'_j$ and Sketch $S'_k$, respectively, the resulting sketch is referred to as Sketch $S''_u$. At block 1100, all the values from Sketch $S'_k$ are copied into (initially empty) Sketch $S''_u$. Then, a value from Sketch $S'_j$ is selected at block 1110 and compared to one or more values in Sketch $S'_k$ at block 1120. The values that are not found in are then inserted into the Sketch $S''_u$ sample set at block 1130. Once all the values in the Sketch $S'_j$ sample set have been selected, the process eventually proceeds from block 1120 to block 1150. At block 1150, K (i.e., the maximum size of Sketch $S''_u$) is set to the minimum of the Ks for Sketch $S'_k$ and Sketch $S'_j$. At block 1160, K is compared with the actual sample set size of Sketch $S''_u$. If the actual sample set size of Sketch $S''_u$ is lower than or equal to K, then, at block 1170, all the values in the Sketch $S''_u$ sample set size that are larger than K'th value in Sketch $S''_u$ are removed.

Figure 12:
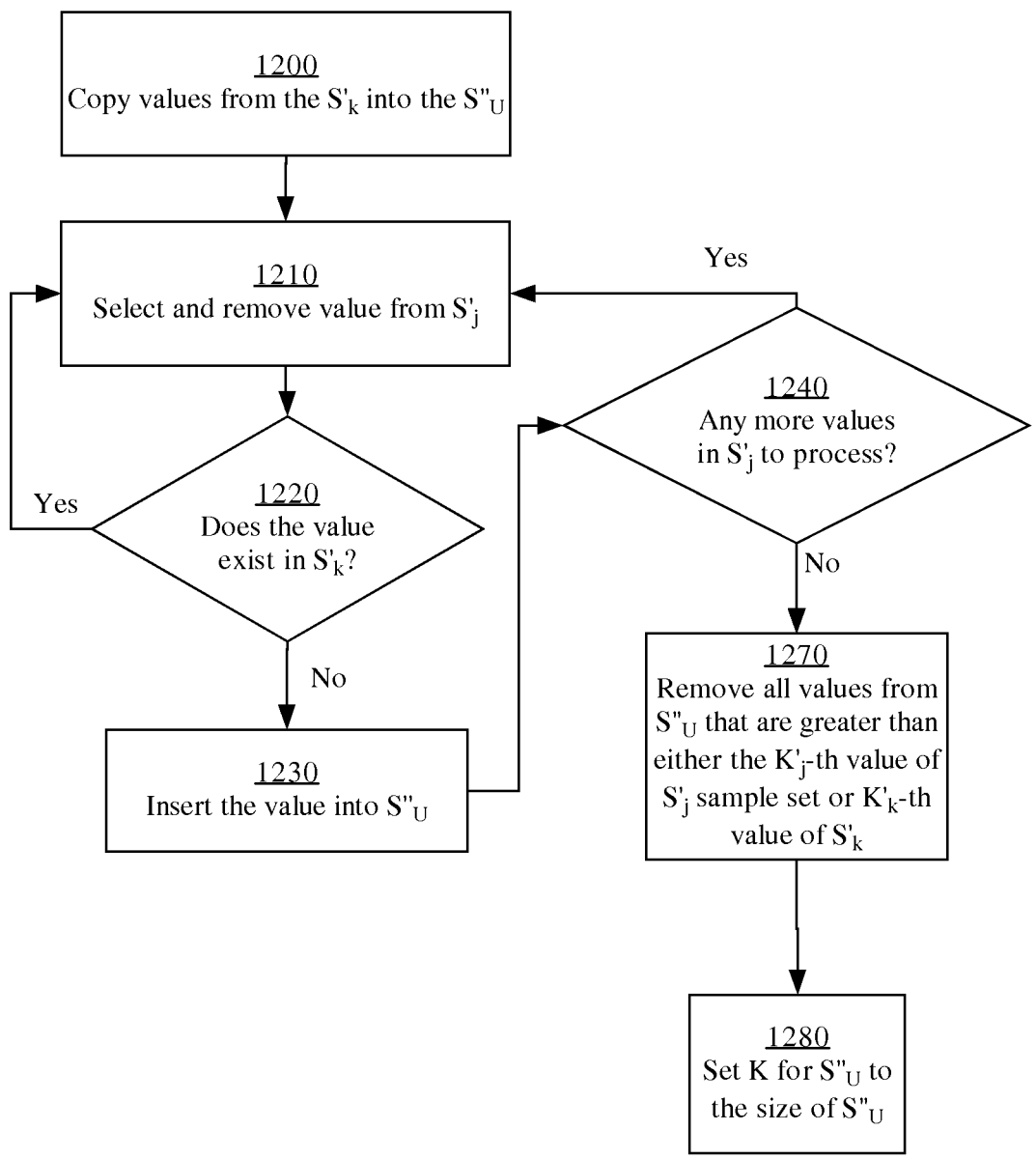
FIG. 12 is a flow diagram that depicts an alternative process for performing a union operation on two fixed-size sketches to yield a union fixed-size sketch, in an embodiment.

FIG. 12 is a flow diagram that depicts a process for performing a union set operation on fixed-size sketches, in an embodiment. Again, the fixed-sized sketches are referred to as Sketch $S'_j$ and Sketch $S'_k$, respectively, the resulting sketch is referred to as Sketch $S''_u$. Similar to 1100 block in FIG. 11, at 1200 block, all the values from Sketch $S'_k$ are copied into Sketch $S''_u$. Then, a value in Sketch $S'_j$ is selected at block 1210 and compared to the values in Sketch $S'_k$ at block 1220. The values that are not found in Sketch $S'_k$ are inserted into Sketch $S''_u$ at block 1230. Once all the values in the Sketch $S'_j$ sample set have been selected (as determined in block 1240), the process proceeds to block 1270. However, unlike block 1170 in FIG. 11, at block 1270, only those values in Sketch $S''_u$ are removed that are either larger than the K-th value in Sketch $S'_j$ or larger than the K-th value in Sketch $S'_k$.

Theta Sketch Set Operations

In an embodiment, set operations are performed on theta sketches to yield a resulting theta sketch. The size of a resulting theta sketch may depend on the respective thresholds of the input theta sketches.

Figure 13:
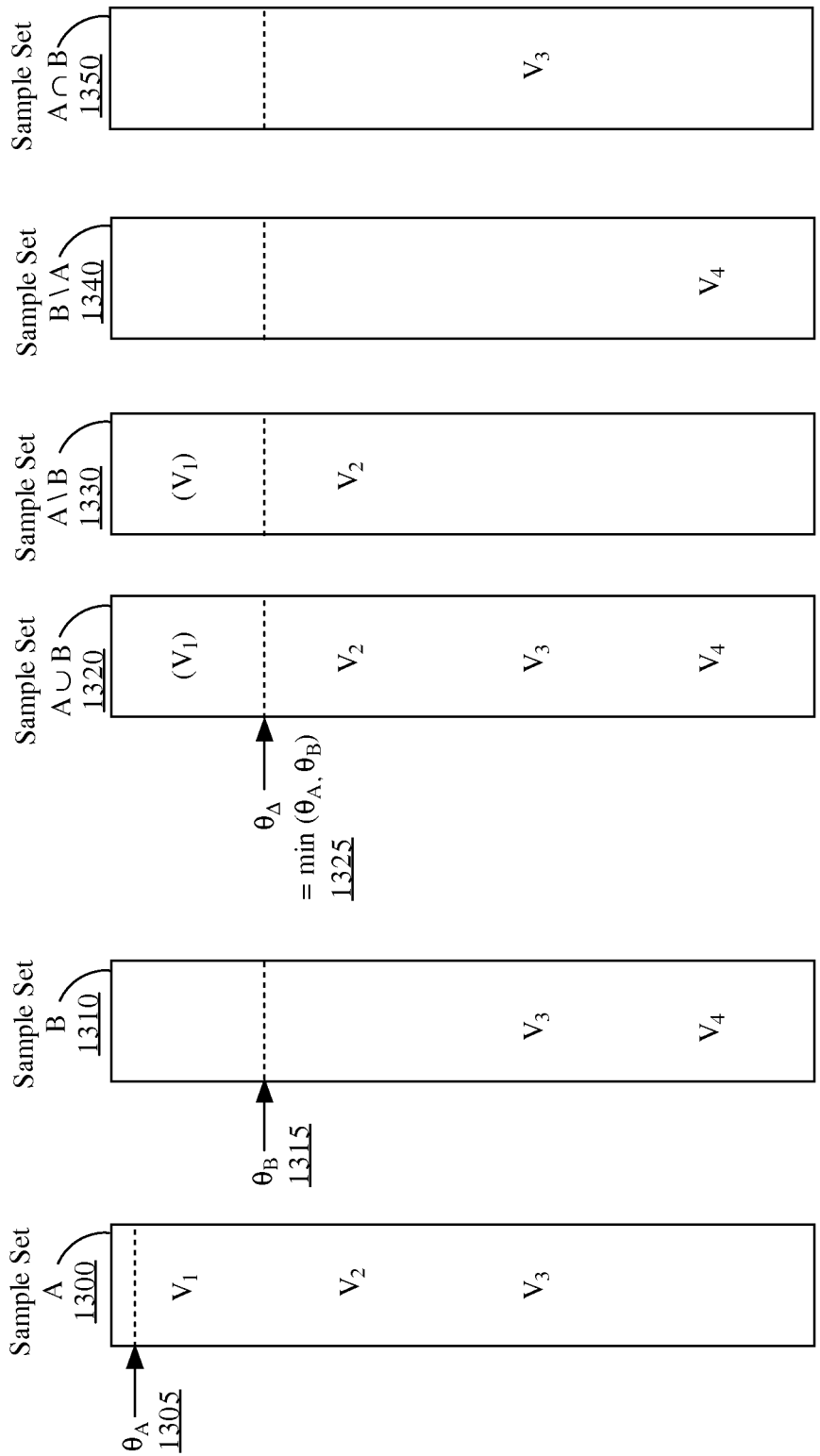
FIG. 13 is a block diagram that depicts resulting theta sketches from set operations on theta sketches, in an embodiment.

FIG. 13 is a block diagram that depicts theta sketches that result from different set operations on two input theta sketches, in an embodiment. Sketch A consists of a sample set, Sample Set A 1300, and an upper threshold, $\theta_A$ 1305, where values in Sample Set A 1300 are depicted in descending order: value $V_1$ is greater than value $V_2$, and value $V_2$ is greater than value $V_3$. Sketch B consists of a sample set, Sample Set B 1310, where values in Sample Set B 1310 are depicted in descending order: value $V_3$ is greater than value $V_4$. Sketch B further consists of an upper threshold, $\theta_B$ 1315, where $\theta_B$ 1315 is less than value $V_1$ and thus, is further less than $\theta_A$ 1305.

To yield a resulting theta sketch for any sketch operation, $\Delta$, such as union, difference or intersection, a resulting sketch upper threshold value is calculated, in an embodiment. The resulting sketch upper threshold, $\theta_\Delta$ 1325, is determined by taking the minimum of the upper thresholds of the operated sketches: $\theta_A$ 1305 and $\theta_B$ 1315. In this embodiment, since $\theta_B$ 1315 is less than $\theta_A$ 1305, $\theta_\Delta$ 1325 is equal to $\theta_B$ 1315.

Next, a resulting sketch sample set for an operation on Sketch A and Sketch B is determined. First, the set operation is performed on Sample Set A 1300 and Sample Set B 1310, and second, any value that is greater than $\theta_A$ 1325 is removed.

For a union operation on Sketch A and Sketch B, the union operation is performed on Sample Set A 1300 values $V_1$, $V_2$, $V_3$ and Sample Set B 1310 values $V_3$, $V_4$. The union operation yields a super set of the values: $V_1$, $V_2$, $V_3$ and $V_4$, as depicted in Sample Set A ∪ B 1320. However, since value $V_1$ is greater than the resulting upper threshold, $\theta_A$ 1325, $V_1$ is removed from Sample Set A ∪ B 1320, as depicted by the parenthesis around $V_1$ in FIG. 13.

Similarly, a difference operation of Sketch A and Sketch B first yields Sample Set A\B 1330. Any value in Sample Set B 1310 that also exists in Sample Set A 1300 is removed from Sample Set A 1300 to produce values $V_1$ and $V_2$ for Sample Set A\B 1330. However, since $V_1$ is greater than the resulting upper threshold, $\theta_A$ 1325, value $V_1$ is removed from Sample Set A\B 1330, as depicted by the parenthesis around $V_1$ in FIG. 13, while value $V_2$ remains in Sample Set A\B 1330.

A difference operation of Sketch B and Sketch A yields Sample Set B\A 1340. Any value in Sample Set A 1300 that also exists in Sample Set B 1310 is removed from Sample Set B 1310 to produce value $V_4$ for Sample Set B\A 1340. Since value $V_4$ is less than $\theta_A$ 1325, value $V_4$ remains in Sample Set B\A 1340.

An intersection operation of Sketch A and Sketch B yields Sample Set A ∩ B 1350. Values $V_1$, $V_2$, $V_3$ from Sample Set A 1300 are intersected with values $V_3$, $V_4$ from Sample Set B 1310 to yield common value $V_3$ for Sample Set A∩B 1350. Since value $V_3$ is less than $\theta_A$ 1325, value $V_3$ remains in Sample Set A∩B 1350.

Figure 14:
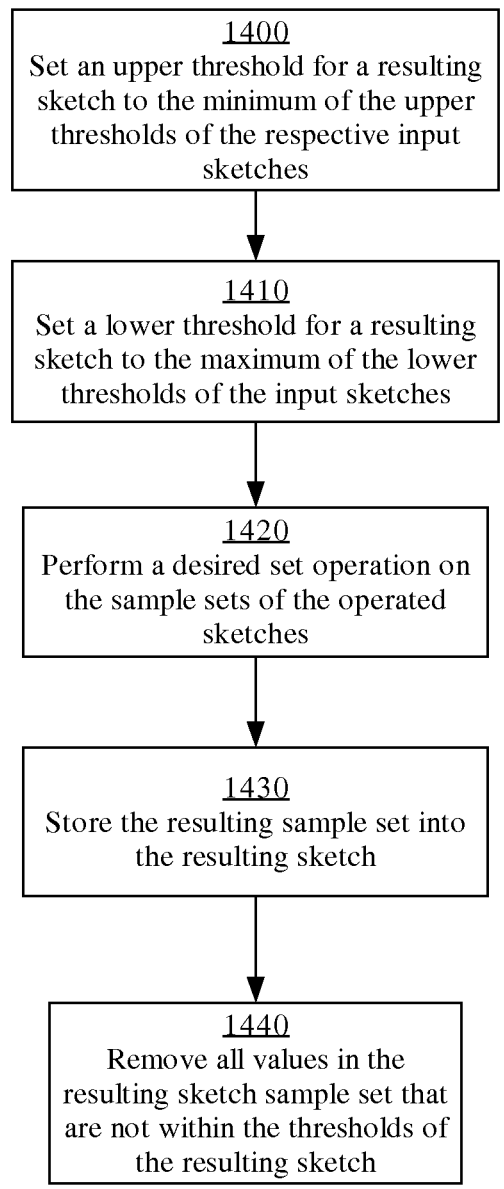
FIG. 14 is a flow diagram that depicts a process for performing a set operation on theta sketches, in an embodiment.

FIG. 14 is a flow diagram that depicts a process for performing a set operation using two theta sketches as input. At blocks 1400 and 1410 thresholds for a resulting sketch is set to the minimum and maximum of thresholds of the respective input sketches. Then, at block 1420, a desired set operation is performed on the sample sets of the operated sketches. The resulting sample set is then stored into the resulting theta sketch at block 1430. All the values in the resulting theta sketch sample set that are not within the thresholds of the resulting sketch are then removed at block 1440. The resulting theta sketch is a product of the desired set operation on the operated theta sketches.

In a related embodiment, a similar process is performed to that of FIG. 14. One difference is that values in the resulting sketch are not removed synchronously to the process. In other words, a separate process may be responsible for removing the values that are to be discarded.

Figure 15:
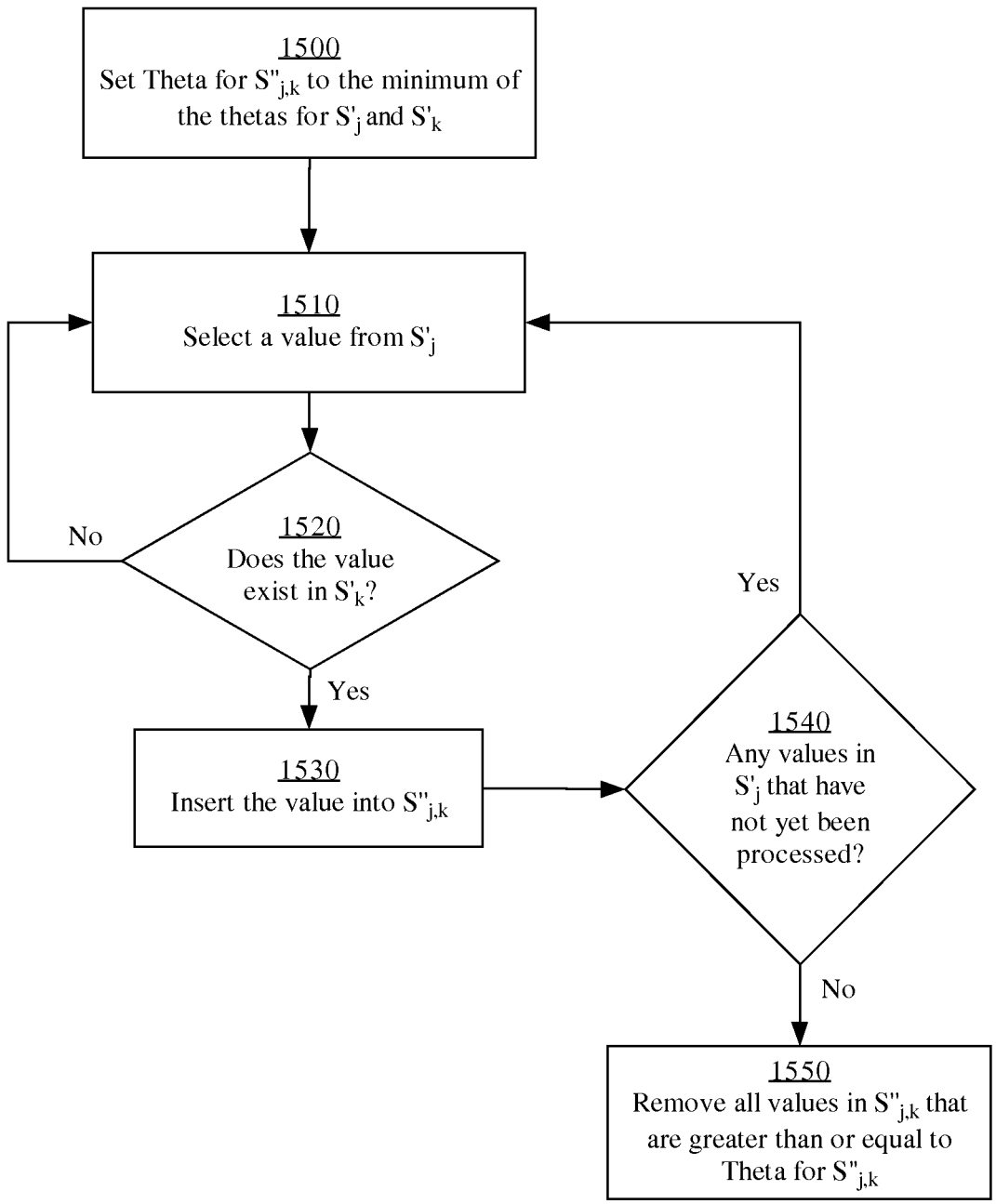
FIG. 15 is a flow diagram that depicts a process for performing an intersection operation on two theta sketches to yield an intersection threshold sketch, in an embodiment.

FIG. 15 is a flow diagram that depicts a process for performing an intersection operation on theta sketches, in an embodiment. The theta sketches are referred to as Sketch $S'_j$ and Sketch $S'_k$, respectively, and the resulting sketch is referred to as Sketch $S''_{j,k}$. At block 1500, theta for the resulting sketch, $S''_{j,k}$, is set to the minimum of the theta's for operated sketches, $S'_k$ and $S'_j$. At block 1510, a value in Sketch $S'_j$ is selected and, at block 1520, compared to the values in Sketch $S'_k$. If the selected value is found in Sketch $S'_k$, then the value is inserted into Sketch $S''_{j,k}$ at block 1530. Once all the values in Sketch $S'_j$ are selected and compared and there are no more values from Sketch $S'_j$ left to process (as determined in block 1540), then the process proceeds to block 1550.

At block 1550, all the values in the Sketch $S''_{j,k}$ sample set that are greater than Theta for Sketch $S''_{j,k}$ are removed. Thus, Sketch $S''_{j,k}$ is a result of the intersection operation on Sketch $S'_k$ and Sketch $S'_j$.

Figure 16:
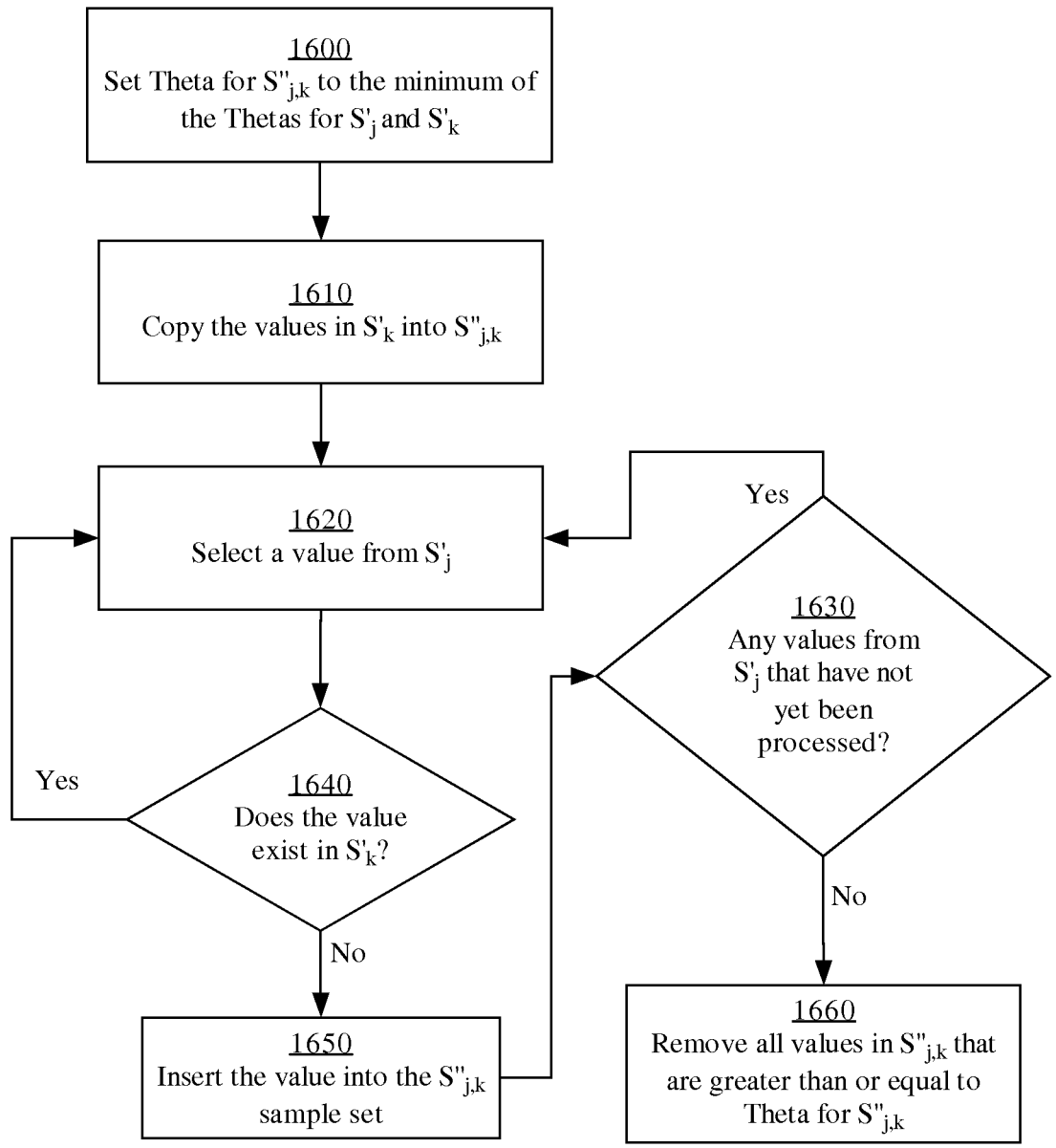
FIG. 16 is a flow diagram that depicts a process for performing a union operation on two theta sketches to yield a union threshold sketch, in an embodiment.

FIG. 16 is a flow diagram that depicts a process for performing a union operation on theta sketches, in an embodiment. The theta sketches are referred to as Sketch $S'_j$ and Sketch $S'_k$, respectively, and the resulting union sketch is referred to as Sketch $S''_u$. At block 1600, Theta for the resulting sketch, $S''_u$, is set to the minimum of Theta's for operated sketches, $S'_k$ and $S'_j$. At block 1610, the values from Sketch $S'_k$ are copied into Sketch $S''_u$. Then, at block 1620, a value from Sketch $S'_j$ is selected and, at block 1640, compared to the values in Sketch $S'_k$. If the selected value does not exist in Sketch $S'_k$, then the value is inserted into Sketch $S''_{j,k}$ at block 1650. Once all the values in Sketch $S'_j$ have been selected and compared and it is determined (at block 1630) that there are no more values from Sketch $S'_j$ left to process, the process proceeds to block 1660. At block 1660, all the values in Sketch $S''_u$ that are greater than Theta for Sketch $S''_u$ are removed.

Sketch Set Operation Cardinality Estimation

Set operations on sketches allow estimated results for combinations of large data sets to be obtained. For example, a large data set may have a log of users who have used a particular web application or who have visited a particular website. Such data may contain user IDs with timestamps. To determine retention amongst users of the web application for each month, a data set of user IDs for one month needs to be queried from the log and intersected with a data set of user IDs for another month. The unique count of the intersection would yield the retention number of users for the web application for those months. An estimation of this result may be obtained by generating sketches from large data set, performing set operations on those sketches, and estimating results based on the sketches produced by performing the set operations.

FIG. 10 (a portion of which was described previously) illustrates such a scenario. Database ($M_1$) 1050 represents a log of user IDs with timestamps for each month i. To obtain an estimation of unique users per month, a sketch, $S'(M_i)$ is generated at block 1055 for each month i. A number of S'(Mi) sketches (e.g., 12, corresponding to each month of a particular year) are stored in SketchMart ($S'_i$) 1060. For generating a retention results for users on monthly basis, sketches, Sketch $S'_k$ and Sketch $S'_k$ may be queried from SketchMart $S'_i$ for j and k month respectively. At block 1065, an intersection operation may be performed on sketches, Sketch $S'_j$ and Sketch $S'_k$ to produce Sketch $S''_{j,k}$. The intersection operation may be performed according to any of the processes described in the set operation sections. Also, since set operations, like intersection, may be performed on sketches retrieved from SketchMart database, such set operations may be performed completely asynchronous from sketch generation described in block 1055. The resulting sketch, Sketch $S''_{j,k}$, at block 1070 would represent the common user ID data for months j and k. Sketch $S''_{j,k}$ may be evaluated for cardinality at block 1075 for estimation of cardinality $Result_{j,k}$. The cardinality, $Result_{j,k}$, would represent the unique count of common users that have visited the site both in month j and k. $Result_{j,k}$ may be stored in a database at block 1080. From the data base of results, at block 1080, a bar chart, 990, can be generated, where each bar represents a count of retention of users who have visited the web application each month.

Set operation produced sketch cardinality can be estimated by the same equations used for cardinality estimation for data generated sketches. The following equation may be used to estimate cardinality based on intersection operation:

$$est(|I|) = \frac{|C_U| - 1}{x_u} * \frac{|C_I|}{|C_U|}. \quad (10)$$

where $|C_U|$ is the cardinality of union sketch of operated sketches, $x_u$ is the maximum value in the union sample set, and $|C_I|$ is the cardinality of the intersection sketch of the operated sketches.

For set operation resulting in a theta sketch, the equation may be further simplified to:

$$est(|I|) = \frac{|C_I|}{\theta_I}. \quad (11)$$

Thus, for theta sketches, cardinality estimation using a resulting theta sketch for any set operation can be accurately estimated as:

$$est(|\Delta|) = \frac{|C_\Delta|}{\theta_\Delta}. \quad (12)$$

where $\Delta$ is any set operation, $|C_\Delta|$ is a cardinality of a resulting sketch sample set from $\Delta$ set operation on operated sketches, and $\theta_\Delta$ is a resulting Theta from $\Delta$ operation on the operated sketches. In an embodiment, $\theta_\Delta$ may be the minimum of $\theta$'s for the operated sketches.

Sketch System

Figure 17:
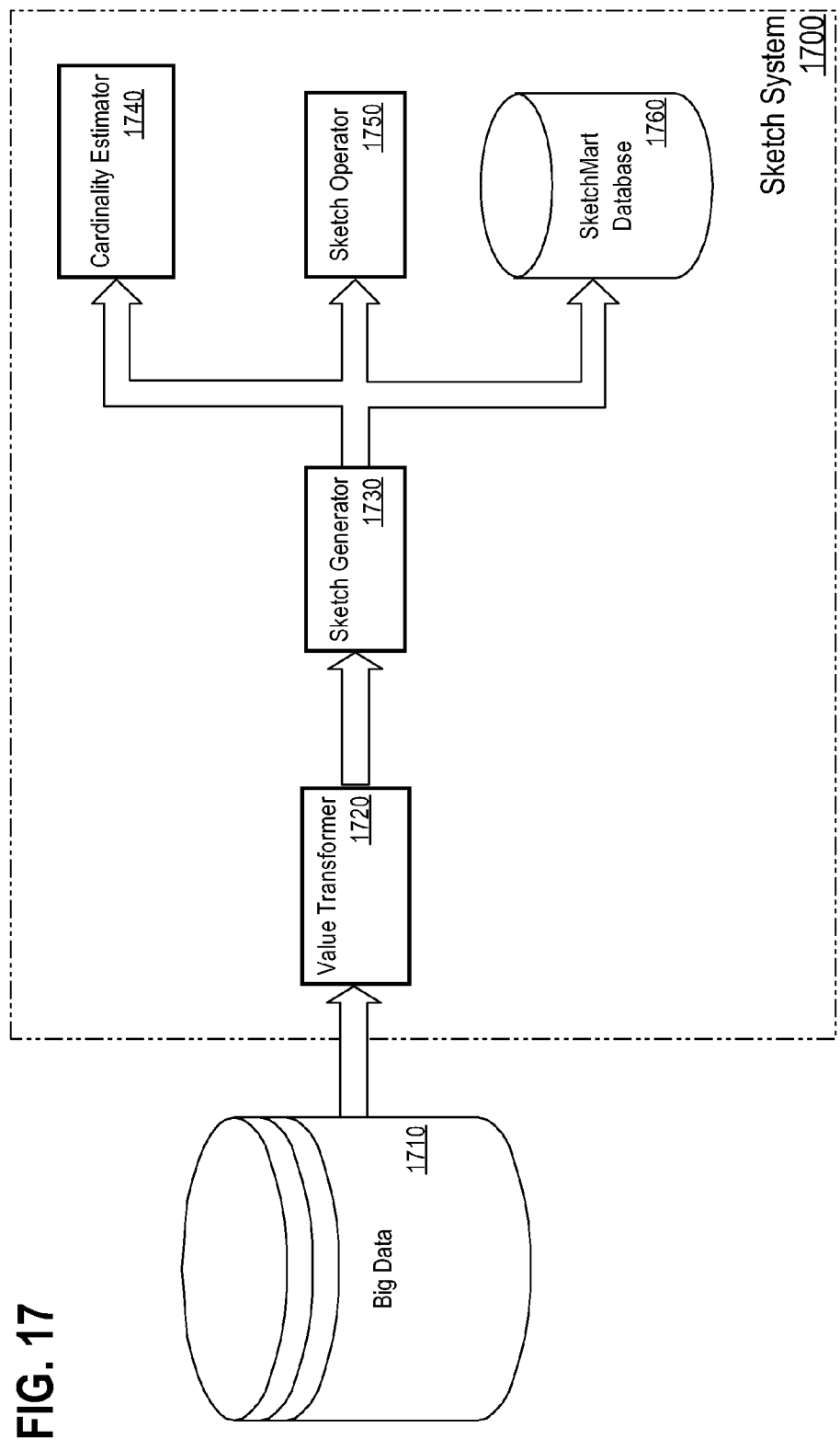
FIG. 17 is a system diagram that illustrates a sketch system, in an embodiment.

FIG. 17 is a block diagram that depicts a sketch system 1700, in an embodiment. Sketch system 1700 may be used for transforming values of large data sets from big data, generating sketches, storing and retrieving sketches from SketchMart database, performing set operations on sketches and estimating cardinalities of large data sets that sketches represent. In an embodiment, a data stream is generated from Big Data 1710 and fed into sketch system 1700. Value Transformer 1720, a component of sketch system 1700, receives the data stream from Big Data 1710. Value Transformer 1720 transforms the data stream into a representative set of values based on which sketches can be generated.

Sketch Generator 1730, a component of sketch system 1700, receives the transformed data set from Value Transformer 1720 and based on the transformed data set, generates a sketch. Sketch Generator 1730 may feed sketches into Cardinality Estimator 1740 or Sketch Operator 1750, or store sketches into SketchMart database 1760 for later retrieval. In an embodiment, Sketch Generator 1730 may receive multiple transformed data sets at once, generate sketches in parallel and feed the sketches to other components of sketch system 1700.

Sketch Operator 1750, a component of sketch system 1700, may receive sketches as input from Sketch Generator 1730 or retrieve sketches from SketchMart database 1760. Sketch Operator 1750 performs set operations on input sketches producing a resulting sketch. Sketch Operator 1750 may store resulting sketches in SketchMart database 1760 or feed sketches to Cardinality Estimator 1740. In an embodiment, Sketch Operator 1750 may perform multiple set operations in parallel and feed resulting sketches to other components of sketch system 1700.

Upon receipt of a sketch, Cardinality Estimator 1740, a component of sketch system 1700, processes sketch and its subset of values to estimate result. In an embodiment, Cardinality Estimator 1740 may perform multiple estimations in parallel to yield multiple results.

Each of Value Transformer 1720, Sketch Generator 1730, Cardinality Estimator 1740, Sketch Operator 1750 and SketchMart database 1760 are part of computer system and may be implemented in software, hardware, or a combination of software and hardware. For example, one or more of Value Transformer 1720, Sketch Generator 1730, Cardinality Estimator 1740, Sketch Operator 1750 and SketchMart database 1760 may be implemented using stored program logic.

Figure 18:
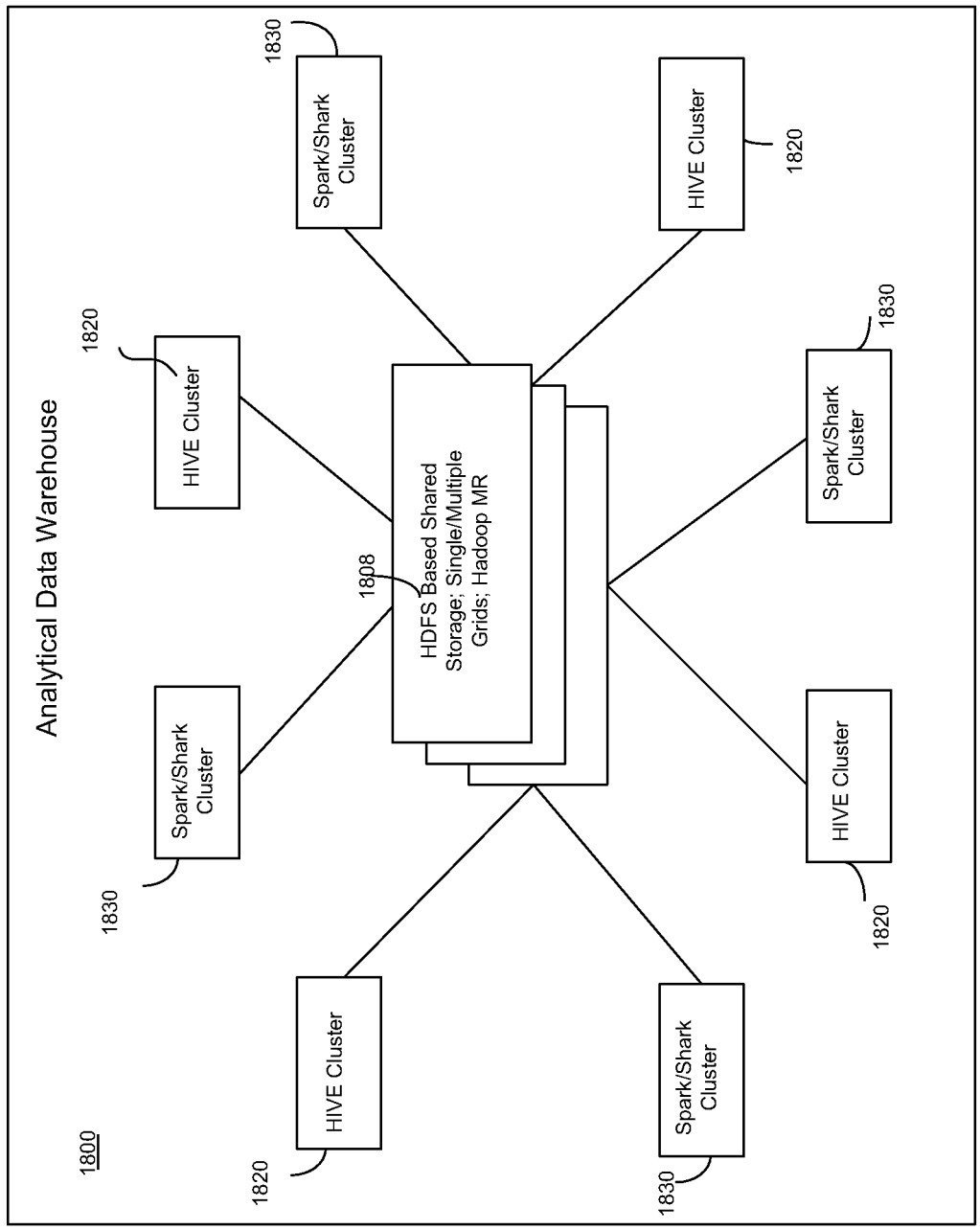
FIG. 18 is a block diagram that depicts various infrastructure components through which a sketch system may be implemented, in an embodiment.

FIG. 18 is a block diagram that depicts various infrastructure components through which a sketch system may be implemented, in an embodiment. The infrastructure components in aggregation are referred to as an analytical data warehouse (ADW) 1800. ADW 1800 may be built using the Hadoop File System (HDFS) 1808 for distributed data storage and Hadoop-MR6, which is a MR (map reduced) driven processing system. Multiple Hadoop systems or grids 1808 may be used. Hadoop grid 1808 includes a Hive-7 system 1820. Optionally, ADW 1800 further includes a Spark/Shark satellite cluster 1830.

In a related embodiment, SketchMart database 1760 may be implemented as part of HDFS 1808. Value Transformer 1720, Sketch Generator 1730, Cardinality Estimator 1740, and Sketch Operator 1750 may be implemented using one or more Hive-7 system 1820 clusters or Spark/Shark satellite clusters 1830.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 19:
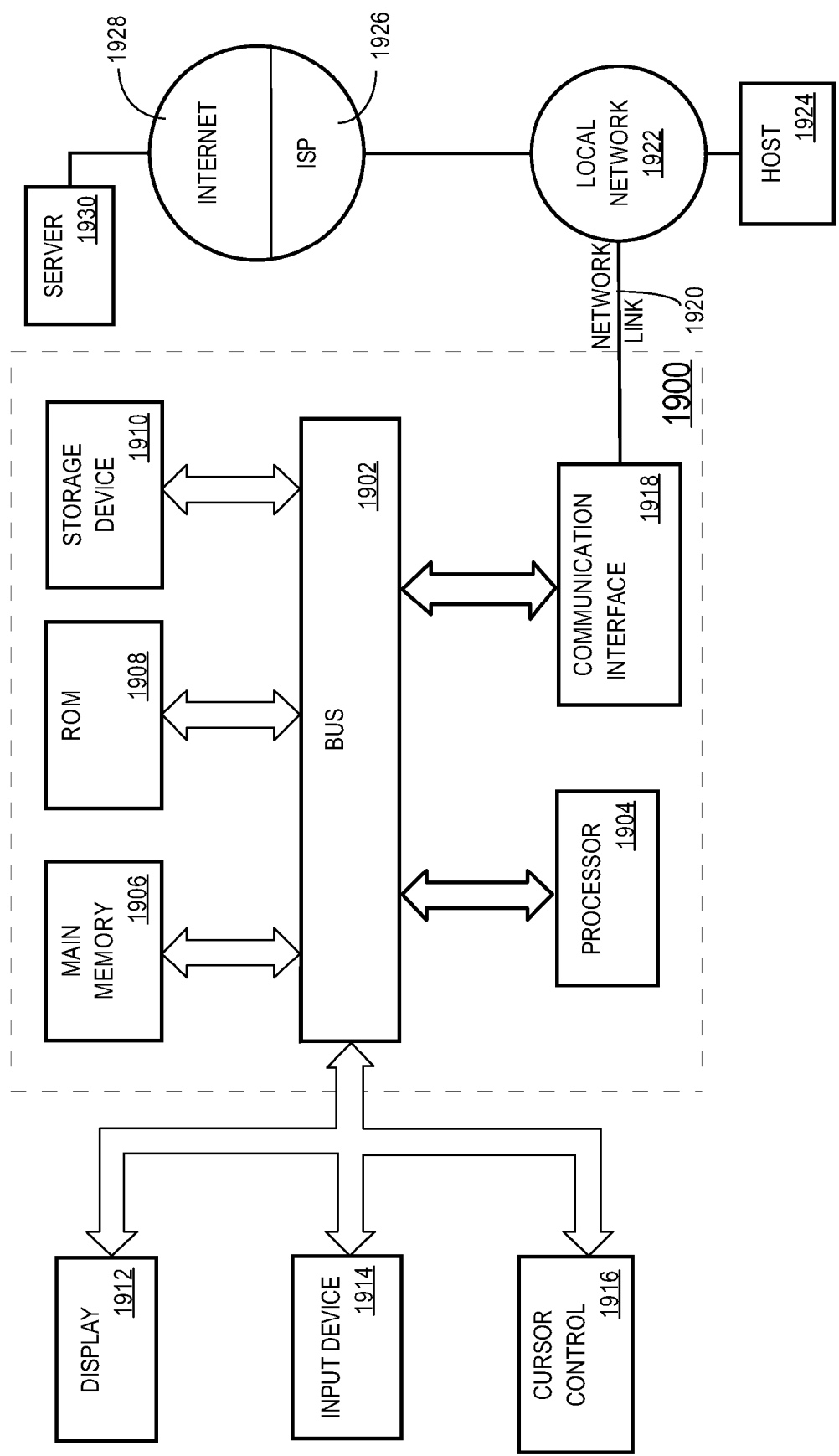
FIG. 19 is a block diagram that illustrates a computer system upon which an embodiment of the invention may be implemented.

For example, FIG. 19 is a block diagram that illustrates a computer system 1900 upon which an embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in non-transitory storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk, optical disk, or solid-state drive is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1910. Volatile media includes dynamic memory, such as main memory 1906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid-state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
 a processor and a non-transitory memory comprising program logic, the program logic comprising:
  a value transformer that is configured to transform input variables into transformed values;
  an initial sketch generator that is configured to generate a plurality of sketches based on the transformed values, wherein each of the plurality of sketches is based on a different set of transformed values;
  a sketch operator that is configured to:
   identify a first maximum value in a first sketch of the plurality of sketches;
   identify a second maximum value in a second sketch of the plurality of sketches;
   determine that the second maximum is greater than or equal to the first maximum;
   remove, from the second sketch, one or more transformed values that are greater than or equal to the first maximum, to generate a second modified sketch;
   perform a set operation on the first sketch and the second modified sketch to generate, as output, a third sketch that is different than the first sketch, the second sketch, and the second modified sketch.

2. The system of claim 1, further comprising:
 a cardinality estimator that is configured to estimate a cardinality of a first set of data values using the third sketch that represents the first set of data values.

3. The system of claim 2, wherein the value transformer is configured to transform the input variables into the transformed values using a hash function.

4. The system of claim 1, wherein the set operation is union, intersection, or difference.

5. The system of claim 1, wherein the transform input variables correspond to user identifications, impressions for particular web pages, or click-through data.

6. A method comprising:
 storing a first data set that contains values that corresponds to a first value range;
 storing a second data set that contains values that corresponds to a second value range that is different than the first value range;
 identifying a first value in the first data set that is a maximum value in the first data set;
 identifying a second value in the second data set that is a maximum value in the second data set;
 determining that the second value is greater than or equal to the first value;
 removing, from the second data set, one or more values that are greater than or equal to the first value, to produce a modified second data set; and
 performing a set operation that takes the first data set and the modified second data set as an input and generates a third data set as output;
 wherein the method is performed by one or more computing devices.

7. The method of claim 6, wherein:
 the first data set is a subset of a first plurality of values that are substantially uniformly distributed; and
 the second data set is a subset of a second plurality of values that are substantially uniformly distributed.

8. The method of claim 7, wherein:
 each value in the first plurality of values is unique relative to each other value in the first plurality of values; and
 each value in the second plurality of values is unique relative to each other value in the second plurality of values.

9. The method of claim 7, wherein each value of the first plurality of values and of the second plurality of values is a hash value.

10. The method of claim 6, wherein the number of values in the first data set or the number of values in the second data set is based on a size of a memory resource.

11. The method of claim 6, wherein the set operation is union, intersection, or difference.

12. The method of claim 6, further comprising:
 identifying a particular value that is a maximum value of the third data set; and
 determining a cardinality of the third data set by dividing a count of values in the third data set by the third value.

13. A method comprising:
 receiving a hash value;
 determining whether the hash value is less than a first maximum value that is associated with a data set that contains a plurality of hash values;
 if it is determined that the hash value is less than the first maximum value, then adding the hash value to the data set;
 if it is determined that the hash value is greater than the first maximum value, then discarding the hash value without adding the hash value to the data set;
 based on a target size that is associated with the data set and the first maximum value, generating a second maximum value that is less than the first maximum value and replacing the first maximum value with the second maximum value;
 removing, from the data set, values that are greater than or equal to the second maximum value, to generate a modified data set as an output;
 wherein the method is performed by one or more computing devices.

14. The method of claim 13, wherein generating the second maximum value is based on determining whether a number of hash values in the data set exceeds the target size.

15. The method of claim 13, wherein generating the second maximum value comprises:
 calculating a first intermediate value by subtracting a first constant from the target size;
 calculating a second intermediate value by adding a second constant to the target size;

calculating the second maximum value by multiplying the first intermediate value with the first maximum value and dividing by the second intermediate value.

16. The method of claim 13, wherein generating the second maximum value is based on a number of hash values in the data set and the target size.

17. The method of claim 13, further comprising, prior to receiving the hash value, generating one or more hash values based on a set of user identifiers and a hash function, wherein the hash value is from the one or more hash values.

18. The method of claim 13, wherein the target size is based on a size of a memory resource.

19. The method of claim 13, wherein the data set is a subset of a plurality of hash values that are substantially uniformly distributed.

20. The method of claim 13, further comprising, prior to receiving the hash value, generating the plurality of hash values based on user identifiers, impression data for particular web pages, or click-through data.

* * * * *